US012711971B2

(12) United States Patent
Huang et al.

(10) Patent No.: US 12,711,971 B2
(45) Date of Patent: Aug. 18, 2026

(54) AUDIO WATERMARK PROCESSING METHOD AND APPARATUS, COMPUTER DEVICE, AND STORAGE MEDIUM

(71) Applicant: Tencent Technology (Shenzhen) Company Limited, Shenzhen (CN)

(72) Inventors: Leichao Huang, Shenzhen (CN); Tianshu Yang, Shenzhen (CN); Hualuo Liu, Shenzhen (CN); Shaoteng Liu, Shenzhen (CN); Qinwei Chang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 129 days.

(21) Appl. No.: 18/790,670

(22) Filed: Jul. 31, 2024

(65) Prior Publication Data

US 2024/0395266 A1 Nov. 28, 2024

Related U.S. Application Data

(63) Continuation of application No. PCT/CN2023/125448, filed on Oct. 19, 2023.

(30) Foreign Application Priority Data

Nov. 28, 2022 (CN) ......................... 202211496709.6

(51) Int. Cl.
*G10L 19/018* (2013.01)
*G10L 19/02* (2013.01)

(52) U.S. Cl.
CPC ............ *G10L 19/018* (2013.01); *G10L 19/02* (2013.01)

(58) Field of Classification Search
CPC .. G10L 19/018; G10L 19/02; G11B 20/00891
(Continued)

(56) References Cited

U.S. PATENT DOCUMENTS

2004/0264732 A1 12/2004 Tian

FOREIGN PATENT DOCUMENTS

CN 103221997 A 7/2013
CN 111341329 A 6/2020
(Continued)

OTHER PUBLICATIONS

International Search Report of PCT/CN2023/125448 dated Feb. 2, 2024 [PCT/ISA/210].
(Continued)

*Primary Examiner* — George C Monikang
(74) *Attorney, Agent, or Firm* — Sughrue Mion, PLLC

(57) ABSTRACT

An audio watermark processing method includes: obtaining input audio; segmenting the input audio, to obtain audio segments; determining original frequency domain coefficients for the audio segments; obtaining embedding information including watermark information and mark information for positioning the watermark information; determining, based on the embedding information, adjustment information corresponding to a first original frequency domain coefficient of a first audio segment of the audio segments; performing an inverse frequency domain transformation on the adjustment information, to obtain a superimposing segment corresponding to the first audio segment; superimposing the first audio segment and a first superimposing segment, to obtain a target audio segment; obtaining target audio segments, embedded with the watermark information; and outputting target audio including the target audio segments.

17 Claims, 8 Drawing Sheets

(58) Field of Classification Search
USPC .................................................. 704/E19.009
See application file for complete search history.

(56) References Cited

FOREIGN PATENT DOCUMENTS

| | | | | | |
|---|---|---|---|---|---|
| CN | 113782041 | A | | 12/2021 | |
| CN | 114861139 | A | * | 8/2022 | ............. G06F 21/16 |
| CN | 115602179 | A | | 1/2023 | |
| JP | 2016-038455 | A | | 3/2016 | |
| WO | 2015/078502 | A1 | | 6/2015 | |

OTHER PUBLICATIONS

Written Opinion of PCT/CN2023/125448 dated Feb. 2, 2024 [PCT/ISA/237].

Jongwon Seok et al: "A novel audio watermarking algorithm for copyright protection of digital audio", Electronics and Telecommunications Research Institute, KR, ETRI Journal, vol. 24, No. 3, Jun. 1, 2002 (Jun. 1, 2002), pp. 181-189, XP002223008, 9 pages.

European Search Report dated Feb. 2, 2026 in Application No. 23896311.0.

* cited by examiner

AUDIO WATERMARK PROCESSING METHOD AND APPARATUS, COMPUTER DEVICE, AND STORAGE MEDIUM

CROSS-REFERENCE TO RELATED APPLICATIONS

This application is a continuation application of International Application No. PCT/CN2023/125448 filed on Oct. 19, 2023, which claims priority to Chinese Patent Application No. 202211496709.6, filed with the China National Intellectual Property Administration on Nov. 28, 2022, the disclosures of each being incorporated by reference herein in their entireties.

FIELD

This application relates to the field of audio technologies, and in particular, to an audio watermark processing method and apparatus, a computer device, and a storage medium.

BACKGROUND

In recent years, with the development of computer network technologies, people can conveniently watch, download, or record an audio work, and a large number of audio works are widely spread on a network. To protect the copyright of a digital work, an audio watermark technology has emerged.

An audio watermark method, such as a time domain audio watermark method, is to transform watermark information into a string of binary data, and represent each piece of sampled data of an audio file as the binary data. Therefore, a lowest bit of each piece of sampled data is replaced with the binary data of the watermark information, thereby embedding a watermark in audio.

However, such audio watermark methods cannot resist various attacks, such as a random cropping attack and a time scale transformation attack. When the audio work is attacked, the watermark information is difficult to be detected.

SUMMARY

According to various embodiments of this application, an audio watermark processing method and apparatus, a computer device, a computer-readable storage medium, and a computer program product are provided.

According to some embodiments, an audio watermark processing method, performed by a computer device, includes: obtaining input audio from an input audio signal, an input audio transmission, an input audio stream, or an input audio file; segmenting the input audio, to obtain a plurality of audio segments; determining a plurality of original frequency domain coefficients for the plurality of audio segments; obtaining embedding information including watermark information and mark information for positioning the watermark information; determining, based on the embedding information, adjustment information corresponding to a first original frequency domain coefficient of a first audio segment of the plurality of audio segments; performing an inverse frequency domain transformation on the adjustment information, to obtain a superimposing segment corresponding to the first audio segment; superimposing the first audio segment and a first superimposing segment, to obtain a target audio segment; obtaining a plurality of target audio segments, embedded with the watermark information; and outputting target audio including the plurality of target audio segments to a target audio signal, a target audio transmission, a target audio stream, or a target audio file.

According to some embodiments, an audio watermark processing apparatus, includes: at least one memory configured to store computer program code; and at least one processor configured to read the program code and operate as instructed by the program code, the program code including: first obtaining code configured to cause at least one of the at least one processor to obtain input audio from an input audio signal, an input audio transmission, an input audio stream, or an input audio file; segmentation code configured to cause at least one of the at least one processor to segment the input audio to obtain a plurality of audio segments; first determining code configured to cause at least one of the at least one processor to determine a plurality of original frequency domain coefficients corresponding to the plurality of audio segments; watermark code configured to cause at least one of the at least one processor to obtain embedding information including watermark information and mark information for positioning the watermark information; first adjustment code configured to cause at least one of the at least one processor to determine based on the embedding information, adjustment information corresponding to a first original frequency domain coefficient of a first audio segment of the plurality of audio segments; second adjustment code configured to cause at least one of the at least one processor to perform an inverse frequency domain transformation on the adjustment information, to obtain a superimposing segment corresponding to the first audio segment; superimposition code configured to cause at least one of the at least one processor to superimpose the first audio segment and a first superimposing segment, to obtain a target audio segment; second obtaining code configured to cause at least one of the at least one processor to obtain a plurality of target audio segments embedded with the watermark information; and outputting code configured to cause at least one of the at least one processor to output target audio including the plurality of target audio segments to a target audio signal, a target audio transmission, a target audio stream, or a target audio file.

According to some embodiments, a non-transitory computer-readable storage medium, storing computer code which, when executed by at least one processor, causes the at least one processor to at least: obtain input audio from an input audio signal, an input audio transmission, an input audio stream, or an input audio file; segment the input audio to obtain a plurality of audio segments; determine a plurality of original frequency domain coefficients corresponding to the plurality of audio segments; obtain embedding information including watermark information and mark information for positioning the watermark information; determine based on the embedding information, adjustment information corresponding to a first original frequency domain coefficient of a first audio segment of the plurality of audio segments; perform an inverse frequency domain transformation on the adjustment information, to obtain a superimposing segment corresponding to the first audio segment; superimpose the first audio segment and a first superimposing segment, to obtain a target audio segment; obtain a plurality of target audio segments embedded with the watermark information; and output target audio including the plurality of target audio segments to a target audio signal, a target audio transmission, a target audio stream, or a target audio file.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

DESCRIPTION OF EMBODIMENTS

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. For example, the phrase "at least one of A, B, and C" includes within its scope "only A," "only B," "only C," "A and B," "B and C," "A and C" and "all of A, B, and C."

The following clearly and completely describes technical solutions in embodiments of this application with reference to accompanying drawings in the embodiments of this application. Apparently, the described embodiments are some embodiments of this application rather than all of the embodiments. All other embodiments obtained by a person of ordinary skill in the art based on the embodiments of this application without creative efforts shall fall within the protection scope of this application.

Figure 1:
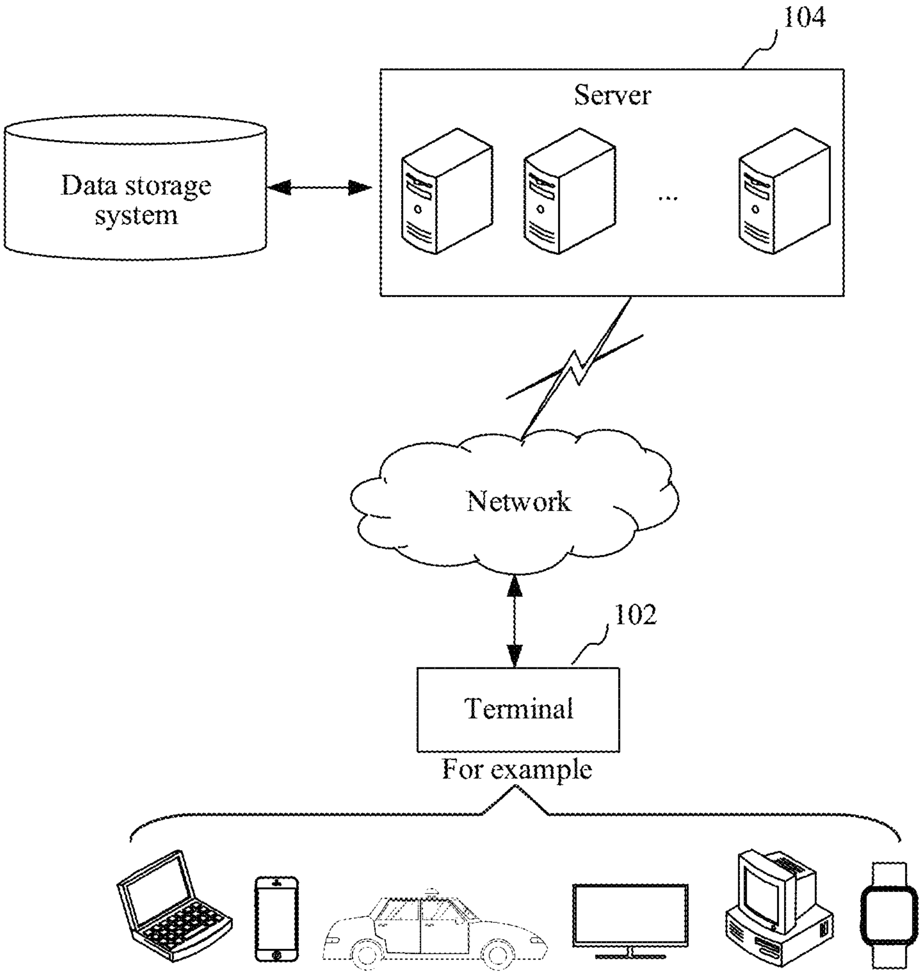
FIG. 1 is a diagram of an application environment of an audio watermark processing method according to some embodiments.

An audio watermark processing method provided in some embodiments may be applied to an application environment shown in FIG. 1. A terminal 102 is connected to a server 104 for communication. The terminal 102 and the server 104 may be directly or indirectly connected in a wired or wireless communication mode, however, the disclosure is not limited thereto. A data storage system may store data that the server 104 is to process. The data storage system may be integrated on the server 104, or placed on a cloud or another server.

In some embodiments, the terminal 102 or the server 104 obtains a plurality of audio segments by dividing to-be-processed audio, and determines an original frequency domain coefficient corresponding to each audio segment. The terminal 102 or the server 104 obtains to-be-embedded information, for any audio segment, determines, based on the to-be-embedded information, adjustment information corresponding to the original frequency domain coefficient of the audio segment, and obtains a to-be-superimposed segment corresponding to the audio segment by performing inverse frequency domain transformation on the adjustment information. Finally, the terminal 102 or the server 104 obtains a plurality of target audio segments by superimposing the audio segment with the corresponding to-be-superimposed segment, and obtains, based on a plurality of target audio segments, target audio embedded with watermark information.

The terminal 102 may be, but not limited to, one or more of a desktop computer, a notebook computer, a smart phone, a tablet computer, an Internet of Things device, a portable wearable device, or the like. The Internet of Things device may be one or more of a smart speaker, a smart television, a smart air condition, a smart in-vehicle device, or the like. The portable wearable device may be one or more of a smart watch, a smart bracelet, a head-mounted device, or the like.

The server 104 may be an independent physical server, or may be a server cluster or a distributed system formed by a plurality of physical servers, or may be a cloud server that provides cloud computing services such as a cloud service, a cloud database, cloud computing, a cloud function, cloud storage, a network service, cloud communication, a middle ware service, a domain name service, a security service, a CDN (Content Delivery Network), big data and an artificial intelligence platform.

In some embodiments, an Application (APP) application program may be loaded on the terminal, including an application program that is to be installed separately, and an applet application that can be used without downloading and installing, for example, one or more of a browser client, a web client, an audio/video client, or the like. The terminal may obtain audio transmitted by the server through the application program. Correspondingly, the server may also obtain audio uploaded by the terminal through the application program, and the like. The terminal or the server may detect the audio to determine whether the audio carries the watermark information.

The watermark information is information that is to be embedded in an audio carrier. According to different application objectives, the watermark information may be one or more of a copyright identifier, a work serial number, text, an image, other audio, or the like.

Figure 2:
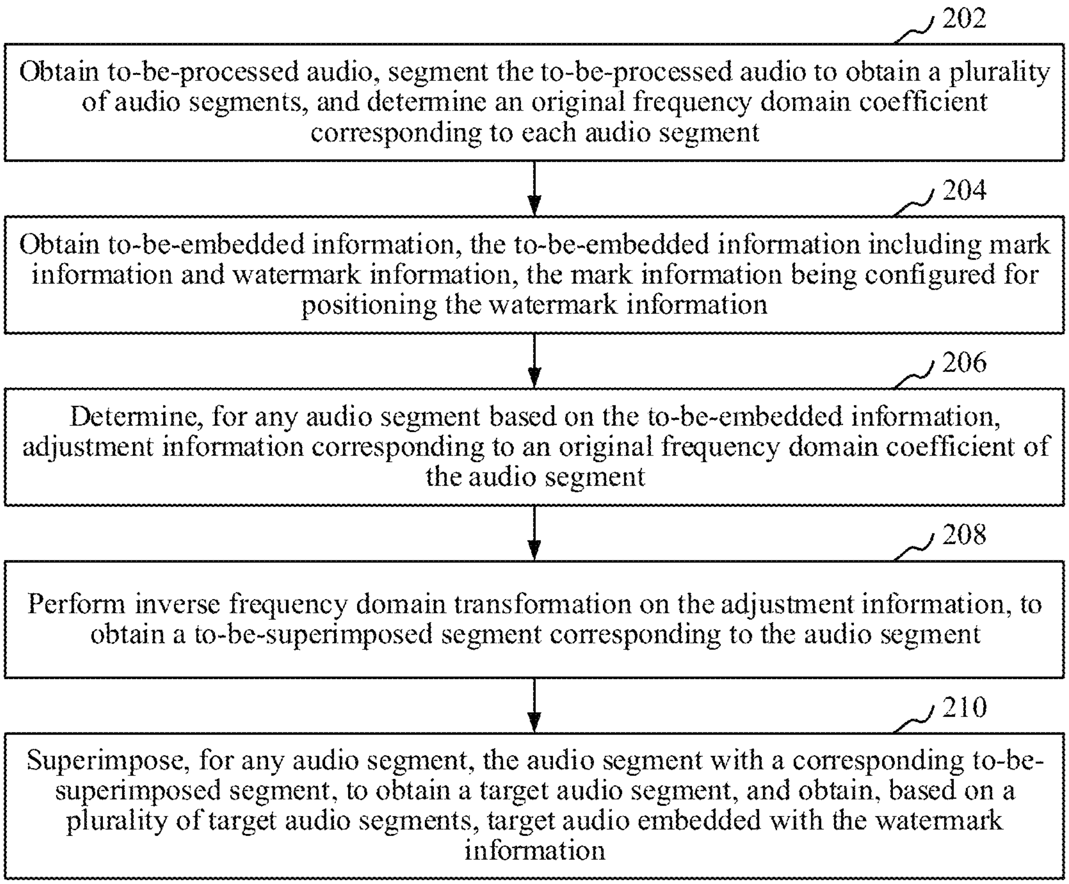
FIG. 2 is a schematic flowchart of an audio watermark processing method according to some embodiments.

In some embodiments, as shown in FIG. 2, an audio watermark processing method is provided. The method may be applied to a terminal or a server, or may be collaboratively performed by the terminal and the server. An example in which the method is applied to a computer device is used for description below. The computer device may be the terminal or the server in FIG. 1. The method includes the following operations.

Operation 202: Obtain to-be-processed audio, segment the to-be-processed audio to obtain a plurality of audio segments, and determine an original frequency domain coefficient corresponding to each audio segment.

The computer device may obtain to-be-processed audio from a local or a network, and segment the to-be-processed audio into a plurality of audio segments. For example, a first second to a tenth second are grouped into a first audio segment, an eleventh second to a twentieth second are grouped into a second audio segment, . . . , and the like. In some embodiments, the computer device may segment the to-be-processed audio according to a preset length L, to obtain the plurality of audio segments. A plurality of, a plurality of bits, or the like in means more than one or more than one bit.

For each audio segment, the computer device performs frequency domain transformation on the audio segment, and transforms the audio segment from time domain to frequency domain, to obtain the original frequency domain coefficient of the audio segment. In some embodiments, the original frequency domain coefficient is a plurality of bits of frequency domain coefficients obtained by performing frequency domain transformation on the audio segment. Each bit of frequency domain coefficient represents a weight of each audio component of the audio segment mapped in frequency domain.

The frequency domain transformation includes, but is not limited to, one or more of discrete Fourier transform (DFT), discrete cosine transform (DCT), discrete wavelet transformation (DWT), discrete-time Fourier transform (DTFT), or the like. For example, the frequency domain transformation refers to performing fast Fourier transform (FFT) on the audio segment, and the frequency domain coefficient is an FFT coefficient obtained by performing FFT.

Operation 204: Obtain to-be-embedded information, the to-be-embedded information including mark information and watermark information, the mark information being configured for positioning the watermark information.

The computer device may obtain to-be-embedded information, and the to-be-embedded information may include mark information and watermark information. The watermark information is configured for sourcing the audio. The mark information is configured for positioning the watermark information, and a position of the watermark information can be accurately positioned through a position of the mark information. The to-be-embedded information is a sequence formed by binarized values, for example, a binary bit sequence formed by 0 and 1. Correspondingly, both the watermark information and the mark information may be randomly generated binary bit sequences. Each binarized value that forms the to-be-embedded information may be referred to as unit embedding information. The unit embedding information is a minimum information unit configured for forming the to-be-embedded information.

To avoid difficulty in distinguishing between the watermark information and the mark information during subsequent watermark detection, in some embodiments, the mark information in the to-be-embedded information includes at least first mark information and second mark information, and the first mark information and the second mark information satisfy a preset similarity condition. The preset similarity condition may be that the first mark information is equal to the second mark information, a difference between the first mark information and the second mark information is less than a first preset threshold, a similarity between the first mark information and the second mark information is greater than a second preset threshold, or the like. The mark information may include more than two pieces of mark information, for example, first mark information, second mark information, third mark information, fourth mark information, . . . , and the like. Different mark information all satisfy the preset similarity condition. An example in which the mark information includes the first mark information, the second mark information, and the third mark information is used. The preset similarity condition may be satisfied between the first mark information and the second mark information, between the first mark information and the third mark information, and between the second mark information and the third mark information.

The preset similarity condition is that a difference between binarized sequences is less than the threshold. For example, the first mark information is the same as the second mark information. For example, both the first mark information and the second mark information are 011010101.

Therefore, at least two pieces of mark information are set, during subsequent detection, the mark information is first detected, and the watermark information is detected according to a position of the mark information, so that a position of the watermark information can be positioned, and attacks such as cropping and inserting other audio may be resisted.

In some embodiments, a quantity of pieces of mark information is a preset quantity, and a change in the preset quantity of pieces of mark information satisfies a preset rule. For example, a plurality of pieces of mark information form an arithmetic sequence, an opposite sequence, or have an increasing carry. For example, the first mark information is 00010001 and the second mark information is 00010011.

In some embodiments, the mark information in the to-be-embedded information may be located before the watermark information. For example, the to-be-embedded information is the first mark information, the second mark information, . . . , and the watermark information in sequence.

Figure 3:
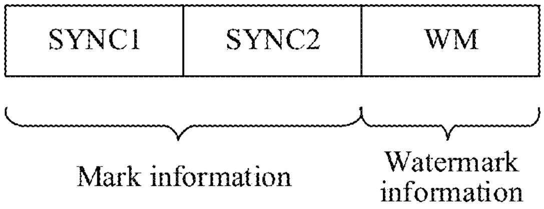
FIG. 3 is a schematic diagram of a structure of to-be-embedded information according to some embodiments.

For example, as shown in FIG. 3, the to-be-embedded information is a binary bit sequence W having N bits:

$$W=\{w_1, w_2, \ldots w_i, \ldots, w_N\},\ \ i=1, 2, \ldots, N$$

Binary bits from a first bit to an $N_1^{th}$ bit are first mark information SYNC1, binary bits from an $(N_1+1)^{th}$ bit to a $2N_1^{th}$ bit are second mark information SYNC2, and binary bits from a $(2N_1+1)^{th}$ bit to an $N^{th}$ bit are watermark information WM. For example, an $i^{th}$ binary bit satisfies the following formula:

$$SYNC1=\{w_i \mid 1 \le i \le N_1\};$$

$$SYNC2=\{w_i \mid N_1+1 \le i \le 2N_1\};$$

$$WM=\{w_i \mid 2N_1+1 \le i \le N\};$$

In some embodiments, the mark information in the to-be-embedded information may be located after the watermark information. For example, the to-be-embedded information is the watermark information, the first mark information, the second mark information, and the like in sequence.

In some embodiments, the mark information in the to-be-embedded information may be interspersed with the watermark information. For example, the to-be-embedded information is the first mark information, the watermark information, and the second mark information, or the first mark information, the second mark information, the watermark information, the third mark information, and the like in sequence.

The foregoing terms first, second, and the like, are used to describe the mark information in the to-be-embedded information, but the mark information is not limited by these terms. These terms are used to distinguish one piece of mark information from another piece of mark information. For example, the first mark information may be referred to as the second mark information, and similarly, the second mark information may be referred to as the first mark information, but unless the context clearly indicates otherwise, they are not the same mark information. Similar cases also include a first type, a second type, and the like.

Operation 206: Determine, for any audio segment based on the to-be-embedded information, adjustment information corresponding to an original frequency domain coefficient of the audio segment.

The adjustment information is information configured for indicating to adjust the original frequency domain coefficient, and may include an adjustment amplitude and an adjustment mode. For any audio segment, the computer device may determine one piece of unit embedding information from the to-be-embedded information and may allocate the unit embedding information to the audio segment. The computer device may determine a target adjustment mode corresponding to an original frequency domain coefficient of the audio segment based on the allocated unit embedding information, and may further determine adjustment information of the original frequency domain coefficient based on the target adjustment mode and a preset adjustment amplitude.

In some embodiments, the computer device allocates corresponding unit embedding information to each audio segment in sequence according to a time sequence of the audio segment and according to a sequence of each piece of unit embedding information in the to-be-embedded information. For example, it is assumed that the to-be-embedded information is a binary bit sequence: {0, 1, 1, 0, 1, 1, 1, 1, 1, 0, 1, 1}, the computer device allocates 0 to a first audio segment, allocates 1 to a second audio segment, and allocates 1 to a third audio segment, . . . , and so on. The allocation may be performed according to a reverse sequence of the to-be-embedded information. For example, the computer device allocates 1 to a first audio segment, allocates 1 to a second audio segment, allocates 0 to a third audio segment, . . . , and so on.

Generally, a length of a segment of audio is greater than a length of the to-be-embedded information. Therefore, the to-be-embedded information may be cyclically and repeatedly embedded in a segment of audio. Even if the audio is cropped or new audio is inserted subsequently, the watermark information may be detected provided that at least a piece of to-be-embedded information can be detected in the audio.

In some embodiments, different unit embedding information may be configured for determining different adjustment modes. The adjustment on the original frequency domain coefficient may be to uniformly adjust all bits of frequency domain coefficients of the original frequency domain coefficient, to adjust each bit of frequency domain coefficient of the original frequency domain coefficient, or to adjust some frequency domain coefficients of the original frequency domain coefficient. The adjustment mode includes, but is not limited to, one or more of up, down, keep, negation, or zeroing.

In some embodiments, for any audio segment, the computer device determines an initial adjustment mode corresponding to an original frequency domain coefficient of the audio segment, adjusts the initial adjustment mode in an adjustment direction represented by unit embedding information allocated for the audio segment, and uses an adjusted adjustment mode as a target adjustment mode corresponding to the audio segment.

In some embodiments, adjustment information of each bit of frequency domain coefficient in an original frequency domain coefficient corresponding to any audio segment is determined based on a target adjustment mode matching the corresponding frequency domain coefficient and a preset adjustment amplitude. An adjustment amplitude may be preset for each adjustment mode, for example, increasing by 20%, reducing 20%, or keeping unchanged (for example, the adjustment amplitude is 0).

For example, the computer device may randomly determine an initial adjustment mode of each bit of frequency domain coefficient in the original frequency domain coefficient of each audio segment. The initial adjustment mode may be performing up or down processing the frequency domain coefficient. The computer device may update the initial adjustment mode according to the unit embedding information allocated for each audio segment, to obtain a final target adjustment mode. For example, unit embedding information 1 represents that the initial adjustment mode is not processed, and unit embedding information 0 represents that negation is performed on the initial adjustment mode. For another example, the unit embedding information 1 represents that an up amplitude is further increased for an up initial adjustment mode; and the unit embedding information 0 represents that a down amplitude is further reduced for a down initial adjustment mode.

Therefore, based on the unit embedding information allocated for each audio segment, the computer device may determine the target adjustment mode of the original frequency domain coefficient corresponding to each audio segment, and may further determine the adjustment information of the original frequency domain coefficient based on the target adjustment mode and the preset adjustment amplitude.

In some embodiments, each of L bits of frequency domain coefficients in the original frequency domain coefficient corresponding to each audio segment corresponds to an adjustment mark, and each adjustment mark is preset with a corresponding initial adjustment mode. For any audio segment, the computer device adjusts L initial adjustment modes in an adjustment direction represented by unit embedding information allocated for the audio segment, to obtain a target adjustment mode corresponding to each bit of frequency domain coefficient. The computer device may determine the adjustment information corresponding to each of the L bits of frequency domain coefficients based on target adjustment modes corresponding to the L bits of frequency domain coefficients and adjustment amplitudes respectively corresponding to L adjustment marks, L being a positive integer greater than 1.

Operation 208: Perform inverse frequency domain transformation on the adjustment information, to obtain a to-be-superimposed segment corresponding to the audio segment.

For any audio segment, after determining adjustment information of an original frequency domain coefficient of the audio segment, the computer device may perform inverse frequency domain transformation on the adjustment information, and transform the adjustment information of the original frequency domain coefficient from frequency domain to time domain, to obtain an audio waveform. The audio waveform is a to-be-superimposed segment corresponding to the audio segment.

The inverse frequency domain transformation is an inverse operation process of frequency domain transformation, for example, inverse discrete Fourier transform, inverse discrete cosine transform, inverse discrete wavelet transform, or inverse fast Fourier transform.

Therefore, inverse frequency domain transformation is performed on the adjustment information corresponding to the audio segment. After the adjustment information is transformed to time domain, the audio segment is superimposed with an original audio segment, instead of directly adjusting the original frequency domain coefficient, so that impact on audio quality can be greatly avoided.

Operation 210: Superimpose, for any audio segment, the audio segment with a corresponding to-be-superimposed segment, to obtain a target audio segment and obtain, based on a plurality of target audio segments, target audio embedded with the watermark information.

For each audio segment, after obtaining a to-be-superimposed segment corresponding to the audio segment, the computer device superimposes the to-be-superimposed segment with the audio segment in time domain, and a superimposed audio segment is a target audio segment. The computer device superimposes the to-be-superimposed segment with a corresponding audio segment, for example, may superimpose a sound waveform of the to-be-superimposed segment with a sound waveform of the audio segment.

Because each audio segment is discrete and an audio signal is continuous, in some embodiments, after obtaining the to-be-superimposed segment, the computer device may perform windowing on the to-be-superimposed segment and superimpose the to-be-superimposed segment with a corresponding audio segment, to obtain the target audio embedded with the watermark information. Windowing is to perform weighted processing on the to-be-superimposed segment by using a window function, so that frequency domain energy is closer to a real frequency spectrum. The window function includes, but is not limited to, one or more of a rectangular window function, a Hamming window function, a Hanning window function, or the like.

The computer device may obtain, based on the plurality of target audio segments, the target audio embedded with the watermark information. For example, the computer device may splice all the target audio segments in sequence, to obtain complete target audio. For another example, in an audio transmission scenario, for case of transmission and storage, the computer device may separately transmit each target audio segment, and each separately transmitted target audio segment forms the target audio.

In some embodiments, the obtaining, based on a plurality of target audio segments, target audio embedded with the watermark information includes: determining a time sequence corresponding to each of the plurality of target audio segments; and splicing the plurality of target audio segments according to the time sequence corresponding to each target audio segment, to obtain the target audio, where the target audio is embedded with the watermark information.

When segmenting the to-be-processed audio, the computer device records time information, for example, a timestamp, corresponding to each audio segment. After obtaining target audio segments, the computer device determines time information of each target audio segment, where the time information of the target audio segment is the same as time information of a corresponding audio segment before superimposition.

The computer device determines, according to the time information corresponding to each target audio segment, a time sequence corresponding to each target audio segment, and therefore splices the plurality of target audio segments according to the time sequence to obtain the target audio. The target audio segments may be spliced in the time sequence to obtain the complete target audio, and the watermark information of the target audio may be embedded into the audio in frequency domain through unit embedding information, so that the audio may not be modified in the time domain, and sound quality of the audio may be protected.

In the foregoing audio watermark processing method, the to-be-processed audio is segmented to obtain the plurality of audio segments, and the original frequency domain coefficient corresponding to each audio segment is determined. In addition, the to-be-embedded information is obtained, the adjustment information of the original frequency domain coefficient corresponding to each audio segment is determined based on the to-be-embedded information, and inverse frequency domain transformation is performed based on the adjustment information to obtain the to-be-superimposed segments, so that direct medication on the original frequency domain coefficient in frequency domain is avoided, and impact on audio quality is avoided as much as possible. The to-be-superimposed segments that are obtained by performing inverse frequency domain transformation based on the adjustment information may be superimposed with corresponding audio segments, to obtain the plurality of target audio segments, so that the target audio is obtained, thereby embedding the watermark information in frequency domain. Because a frequency coefficient may correspond to an actual audio pitch, audio in which watermark information is embedded is difficult to perceive by a human car, and has good transparency. In addition, because the watermark information is embedded in frequency domain, robustness of a frequency domain coefficient energy mean value may be used, and a detection rate and a high robustness are high in the face of a time domain attack. In addition, because the to-be-embedded information carries the mark information, when subsequent audio is subjected to attack such as random cropping and time scale transformation, the position of the watermark information can be accurately positioned according to the mark information, so that the watermark information is accurately detected, and has strong anti-attach performance.

The robustness is a degree of a capability of an audio watermark to resist various attacks. After the audio embedded with the watermark information is subjected to various attack, the watermark information can still be well retained and can be accurately extracted from an audio carrier, which indicates the high robustness. The transparency is a change degree of the audio in which the watermark information is embedded. A watermark embedding mode with good transparency can make audio indifferent from auditory perception before and after the watermark is embedded. The detection rate is a ratio of a quantity of pieces of audio from which the watermark information is successfully extracted to a total quantity of pieces of audio.

In some embodiments, the original frequency domain coefficient includes L bits of frequency domain coefficients, L being a positive integer greater than 1, and the to-be-embedded information includes a plurality of pieces of unit embedding information. The determining, for any audio segment based on the to-be-embedded information, adjustment information corresponding to an original frequency domain coefficient of an audio segment includes: allocating a piece of unit embedding information to each audio segment from the to-be-embedded information; determining, for any audio segment, an adjustment mark matching each of L bits of frequency domain coefficients of the audio segment; determining, based on the unit embedding information allocated for the audio segment, target adjustment modes respectively corresponding to L adjustment marks; and determining, according to the target adjustment modes respectively corresponding to the L adjustment marks, the adjustment information corresponding to the original frequency domain coefficient of the audio segment.

The computer device may allocate a piece of unit embedding information to each audio segment from the to-be-embedded information. For example, the computer device allocates corresponding unit embedding information to each audio segment in sequence according to a sequence of the audio segment and according to a sequence of each piece of unit embedding information in the to-be-embedded information.

For example, the computer device allocates the corresponding unit embedding information to the audio segment from the to-be-embedded information in sequence according to the sequence of the audio segment, for example, for to-be-embedded information 10010011010, unit embedding information 1 is allocated to an audio segment A, unit embedding information 0 is allocated to an audio segment B, unit embedding information 0 is allocated to an audio segment C, and the like. Therefore, both the mark information and the watermark information can be naturally embedded into the to-be-processed audio.

For each audio segment, the computer device determines an adjustment mark matching each bit of frequency domain coefficient in an original frequency domain coefficient corresponding to each audio segment. The adjustment mark represents an initial adjustment mode corresponding to each bit of frequency domain coefficient. The initial adjustment mode may be any one of a plurality of preset adjustment modes.

A type of the adjustment mark includes, but is not limited to, one or more of up, down, keep, or the like. The adjustment mark may be represented by a character. For example, a sequence formed by adjustment marks may be {up, down, down, keep, . . . }, or {1, 2, 0, 1, 0, 2, . . . } (where an adjustment mark 1 represents up, an adjustment mark 2 represents down, and an adjustment mark 0 represents keep).

For ease of description, one of the plurality of audio segments is used as an example for description, and the audio segment is referred to as a current audio segment. After determining unit embedding information corresponding to the current audio segment, the computer device adjusts, in an adjustment direction represented by the unit embedding information, an initial adjustment mode corresponding to each adjustment mark matching the current audio segment, to obtain a target adjustment mode.

The computer device may finally determine adjustment information of an original frequency domain coefficient corresponding to the current audio segment according to target adjustment modes respectively corresponding to L adjustment marks matching the current audio segment and with reference to preset adjustment amplitudes respectively corresponding to the L adjustment marks.

In some embodiments, the adjustment mark corresponding to each audio segment is determined, and the initial adjustment mode indicated by the adjustment mark is adjusted under impact of the allocated unit embedding information, to finally obtain the target adjustment mode, so that when the to-be-embedded information is binarized information, the adjustment mode of the frequency domain coefficient can be enriched as much as possible by using a combination of the adjustment mark and the unit embedding information, and the adjustment information can be accurately determined for each bit of frequency domain coefficient.

In some embodiments, the allocating a piece of unit embedding information to each audio segment from the to-be-embedded information includes: determining, according to a sequence of the unit embedding information in the to-be-embedded information, current unit embedding information from the to-be-embedded information; determining, according to a time sequence of the audio segment, a current audio segment from the plurality of audio segments; allocating the current unit embedding information to the current audio segment; using a next piece of unit embedding information as current unit embedding information of a next allocation, and using a next audio segment of the current audio segment as a current audio segment of the next allocation; returning to the operation of allocating the current unit embedding information to the current audio segment and continuing to perform the operation until last-bit unit embedding information in the to-be-embedded information is allocated; and using first-bit unit embedding information in the to-be-embedded information as current unit embedding information of a next cycle, and performing a plurality of cycle allocations until all audio segments are allocated with the unit embedding information.

When allocating unit embedding information for M audio segments, the computer device may allocate the unit embedding information to the M audio segments starting from first-bit unit embedding information in sequence according to the sequence of each piece of unit embedding information in the to-be-embedded information. M being a positive integer greater than 1.

The computer device may determine current to-be-allocated unit embedding information according to the sequence of each piece of unit embedding information in the to-be-embedded information. The computer device allocates the current unit embedding information to a current audio segment of the M audio segments, uses a next piece of unit embedding information as current unit embedding information of a next allocation, and uses a next audio segment of the current audio segment as a current audio segment of the next allocation. The next audio segment of the current audio segment may be an audio segment whose time sequence is after a time sequence of the current audio segment and that is adjacent to the current audio segment.

After this allocation is completed, the computer device continues to perform the next allocation until last-bit unit embedding information in the to-be-embedded information is allocated. If an audio length exactly matches the length of the to-be-embedded information, the corresponding unit embedding information is allocated to each audio segment, and the computer device completes an allocation process.

When the audio length is greater than the length of the to-be-embedded information, the computer device re-uses the first-bit unit embedding information as current unit embedding information of a next cycle, and selects a first audio segment as a current audio segment from the audio segments on which allocation is not performed, and performs allocation again. Therefore, the computer device performs a plurality of cycle allocations until all the audio segments are allocated with the corresponding unit embedding information.

In some embodiments, the unit embedding information in the to-be-embedded information is cyclically allocated to each audio segment, so that the to-be-embedded information is cyclically embedded into the to-be-processed audio. Even if the audio is cropped or new audio is inserted subsequently, the watermark information may be detected provided that at least one piece of to-be-embedded information can be detected in the audio, and strong anti-attack performance and high robustness may be achieved.

In some embodiments, the determining, for any audio segment, an adjustment mark matching each of L bits of frequency domain coefficients of the audio segment includes: obtaining, for any audio segment, an adjustment mask corresponding to the audio segment, where the adjustment mask includes the L adjustment marks; and using an $l^{th}$ adjustment mark in the adjustment mask as an adjustment mark of an $l^{th}$ bit of frequency domain coefficient in L bits of frequency domain coefficients of the audio segment, where 1 is a positive integer greater than 1 and less than or equal to L.

Each audio segment corresponds to an adjustment mask, and the adjustment mask is configured for indicating how to adjust each bit of frequency domain coefficient in the original frequency domain coefficient. The adjustment mask includes a plurality of adjustment marks. A quantity of bits of the adjustment mark is the same as a quantity of bits of the original frequency domain coefficient, and both are L. The adjustment masks of different audio segments may be randomly generated.

Figure 4:
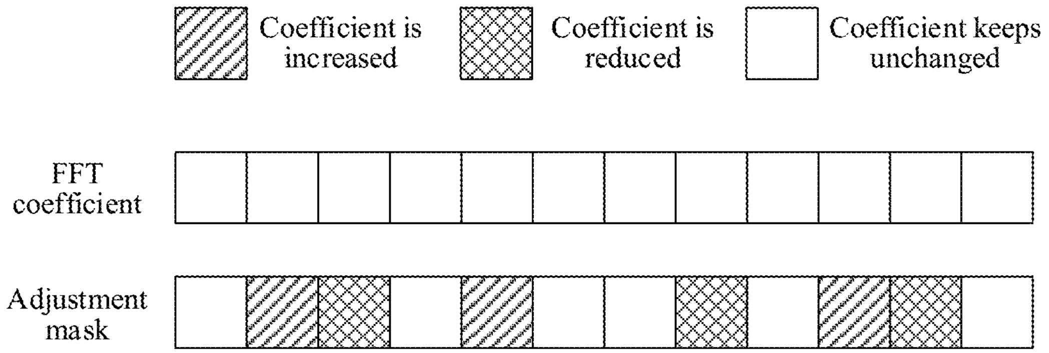
FIG. 4 is a schematic diagram of a structure of an adjustment mask according to some embodiments.

For example, an FFT coefficient of an audio segment A, for example, has L bits of coefficients, and an adjustment mask corresponding to the audio segment A also has L bits. An adjustment mark may be set to each bit in the adjustment mask. For example, as shown in FIG. 4, different adjustment marks are represented in different filling modes in the figure. A first adjustment mark in the adjustment mask indicates that a coefficient keeps unchanged, and the computer device may keep a value of a first bit of coefficient in the FFT coefficient unchanged; a second adjustment mark in the adjustment mask indicates that the coefficient is increased, an the computer device may increase a value of a second bit of coefficient in the FFT coefficient; a third adjustment mark in the adjustment mask indicates that a coefficient is reduced, and the computer device may reduce a value of a third bit of coefficient in the FFT coefficient; and so on. An amplitude by which the computer device increases or reduces the FFT coefficient may be a preset amplitude, for example, increasing or reducing the FFT coefficient by 10%.

Figure 5:
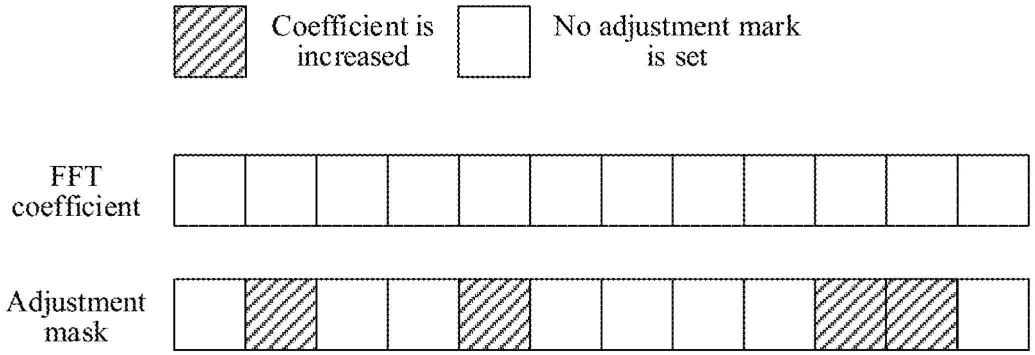
FIG. 5 is a schematic diagram of a structure of an adjustment mask according to some embodiments.

For another example, in the adjustment mask, the adjustment mark may be set only at a position at which up or down processing is used, and no adjustment mark is set at the remaining positions, which represents that no processing is performed on coefficients. For example, as shown in FIG. 5, for one or more bits of coefficients that is to be increased, adjustment marks representing that the coefficients are increased are set at corresponding positions in the adjustment mask.

For any audio segment, the computer device may obtain an adjustment mask corresponding to the audio segment, to obtain L adjustment marks. The quantity of adjustment marks in the adjustment mask is the same as a quantity of bits of an original frequency domain coefficient, and both are L.

For any audio segment, the computer device determines an original frequency domain coefficient corresponding to the audio segment. For a current frequency domain coefficient in the original frequency domain coefficient, the computer device determines a target adjustment mark at a same position from the L adjustment marks according to a position of the current frequency domain coefficient in the original frequency domain coefficient, and uses the target adjustment mark as an adjustment mark matching the current frequency domain coefficient. For example, a first adjustment mark corresponds to a first bit of frequency domain coefficient, a second adjustment mark corresponds to a second bit of frequency domain coefficient, an $l^{th}$ adjustment mark corresponds to an $l^{th}$ bit of frequency domain coefficient, and the like. For each bit of frequency domain coefficient, the computer device performs the foregoing processing, so that the adjustment mark corresponding to each frequency domain coefficient may be determined.

Therefore, for any audio segment, the computer device may determine an initial adjustment mode for each bit of frequency domain coefficient in an original frequency domain coefficient of the audio segment based on an adjustment mask corresponding to the audio segment, and update the initial adjustment mode with reference to unit embedding information allocated for the audio segment, to obtain a final target adjustment mode. Therefore, it is determined that each bit of frequency domain coefficient of the audio segment is increased, keeps unchanged, or is reduced. Based on a preset up amplitude and a preset down amplitude, the computer device may determine adjustment information of the original frequency domain coefficient. The adjustment information of the original frequency domain coefficient includes adjustment information for each bit of frequency domain coefficient in the original frequency domain coefficient, for example, increasing each bit of frequency domain coefficient by 20%, or reducing each bit of frequency domain coefficient by 20%.

For example, it is assumed that the to-be-embedded information is a binary bit sequence formed by 0 and 1. When unit embedding information allocated for an audio segment is a bit 1, an adjustment mode of an adjustment mark (for example, represented by up, down, or keep) in an adjustment mask is unchanged. The adjustment mark up may indicate that a frequency domain coefficient is increased, the adjustment mark down may indicate that the frequency domain coefficient is reduced, and the adjustment mark keep may indicate that the frequency domain coefficient keeps unchanged. When unit embedding information allocated for an audio segment is a bit 0, an adjustment mode of an adjustment mark (for example, represented by up, down, or keep) in an adjustment mask is opposite. The adjustment mark up may indicate that a frequency domain coefficient is reduced, the adjustment mark down may indicate that the frequency domain coefficient is increased, and the adjustment mark keep may indicate that the frequency domain coefficient keeps unchanged. Adjustment information delta for each bit of frequency domain coefficient may be represented by the following formula:

$$\begin{cases} \text{delta}A(i) = +fftA(i)^{\alpha} \\ \text{delta}B(i) = -fftB(i)^{\alpha} \end{cases} w = 1;$$

$$\begin{cases} \text{delta}A(i) = -fftA(i)^{\alpha} \\ \text{delta}B(i) = +fftB(i)^{\alpha} \end{cases} w = 0;$$

w represents unit embedding information, fft( ) represents a frequency domain coefficient, A(i) represents a frequency domain coefficient corresponding to up, and B(i) represents a frequency domain coefficient corresponding to down. $\alpha$ is a watermark intensity, and is configured for balancing audio quality and watermark robustness; and a larger value of the watermark intensity indicates stronger robustness of a watermark and poorer sound quality. Generally, a value of $\alpha$ may range from 0.02 to 0.05.

In some embodiments, the adjustment mask corresponding to each audio segment is obtained, where the adjustment mask includes a plurality bits of adjustment marks that correspond to the audio segments and whose quantity of bits is the same as the quantity of bits of the original frequency domain coefficient; for a current frequency domain coefficient in the original frequency domain coefficient, a target adjustment mark at a corresponding position is determined from the plurality of bits of adjustment marks according to a position of the current frequency domain coefficient in the original frequency domain coefficient; and the target adjustment mark is used as an adjustment mark matching the current frequency domain coefficient.

The to-be-embedded information may be a binarized value, in some embodiments, a value type of the unit embedding information includes a first type and a second type, and for any adjustment mark, an adjustment direction of a target adjustment mode that corresponds to each adjustment mark and that is determined based on the first type of unit embedding information is opposite to an adjustment direction of a target adjustment mode determined based on the second type of unit embedding information.

Each adjustment mark may represent that the frequency domain coefficient is processed in which adjustment direction (up or down), and the unit embedding information is configured for processing the adjustment direction determined by using the adjustment mark. Processing modes represented by unit embedding information of different value types are opposite.

For example, for an audio segment A, adjustment marks corresponding to an original frequency domain coefficient of the audio segment A are respectively {up, down, down, keep, . . . }. When unit embedding information allocated for the audio segment A is of the first type (for example, 1), adjustment modes represented by the adjustment marks corresponding to the audio segment A keep unchanged and are still {up, down, down, keep, . . . }, for example, adjustment directions of target adjustment modes respectively corresponding to the adjustment marks keep unchanged. When unit embedding information allocated for the audio segment A is of the second type (for example, 0), the computer device performs negation on the adjustment modes represented by the adjustment marks corresponding to the audio segment A, for example, {down, up, up, keep, . . . }. For example, the target adjustment modes respectively corresponding to the adjustment marks are opposite to the original adjustment modes. For an adjustment mark that keeps unchanged, an adjustment mark obtained by the computer device performing negation the adjustment mark is still itself.

Therefore, the adjustment direction of each adjustment mark is determined based on the unit embedding information, so that the target adjustment mode is obtained, and the target adjustment modes determined based on the unit embedding information of different value types have different adjustment directions. The watermark information cannot be obtained only by using the unit embedding information or the adjustment mask, so that a mode of embedding the watermark in the audio is more secure and stable.

In some embodiments, the determining, based on unit embedding information allocated for the audio segment, target adjustment modes respectively corresponding to L adjustment marks includes: determining a value type of the unit embedding information allocated for the audio segment; when the value type is the first type, using initial adjustment modes respectively corresponding to the L adjustment marks as the target adjustment modes respectively corresponding to the L adjustment marks; and when the value type is the second type, performing reverse processing on the initial adjustment modes respectively corresponding to the L adjustment marks, to obtain the target adjustment modes respectively corresponding to the L adjustment marks.

For any audio segment of the plurality of audio segments, the computer device determines a value type of unit embedding information corresponding to the audio segment.

When the value type of the unit embedding information is the first type, the computer device uses the initial adjustment modes respectively corresponding to the L adjustment marks as the target adjustment modes respectively corresponding to the L adjustment marks. The computer device may keep the adjustment mode represented by each adjustment mark unchanged.

For example, if the adjustment mark up indicates that up processing is performed on a frequency domain coefficient, when the value type of the unit embedding information is 1 (the first type), the computer device determines that a final target adjustment mode of a corresponding frequency domain coefficient is up processing.

When the value type of the unit embedding information is the second type, reverse processing is performed on the initial adjustment modes respectively corresponding to the L adjustment marks, to obtain the target adjustment modes respectively corresponding to the L adjustment marks. The computer device may perform negation on the adjustment mode represented by each adjustment mark.

For example, if the adjustment mark up indicates that up processing is performed on a frequency domain coefficient, when the value type of the unit embedding information is 0 (the second type), the computer device determines that a final target adjustment mode of a corresponding frequency domain coefficient is down processing.

In some embodiments, the adjustment mark corresponding to each audio segment is determined, and the initial adjustment mode indicated by the adjustment mark is adjusted under impact of the allocated unit embedding information, to finally obtain the target adjustment mode. When the to-be-embedded information is binarized information, the adjustment mode of the frequency domain coefficient can be enriched as much as possible by using a combination of the adjustment mark and the unit embedding information, and an adjustment amount can be accurately determined for each bit of frequency domain coefficient.

Further provided is an application scenario, and the foregoing audio watermark processing method may be applied to the application scenario as follows. A terminal uploads to-be-processed audio to a server. After obtaining the to-be-processed audio, the server segments the to-be-processed audio to obtain a plurality of audio segments, and determines an original frequency domain coefficient corresponding to each audio segment. In addition, the server obtains to-be-embedded information, determines, for any audio segment, adjustment information corresponding to an original frequency domain coefficient of the audio segment based on the to-be-embedded information, performs inverse frequency domain transformation on the adjustment information, to obtain a to-be-superimposed segment corresponding to the audio segment, finally superimposes the audio segments with corresponding to-be-superimposed segments, to obtain a plurality of target audio segments, and obtains, based on the plurality of target audio segments, target audio embedded with watermark information. The server returns the target audio to the terminal. The server may distribute the target audio embedded with the watermark information to each terminal via a content delivery network, to share and disseminate the audio. However, the disclosure is not limited thereto. The audio watermark processing method provided according to some embodiments may be applied to other application scenarios, such as online livestreaming, streaming media sharing, and online classroom.

Figure 6:
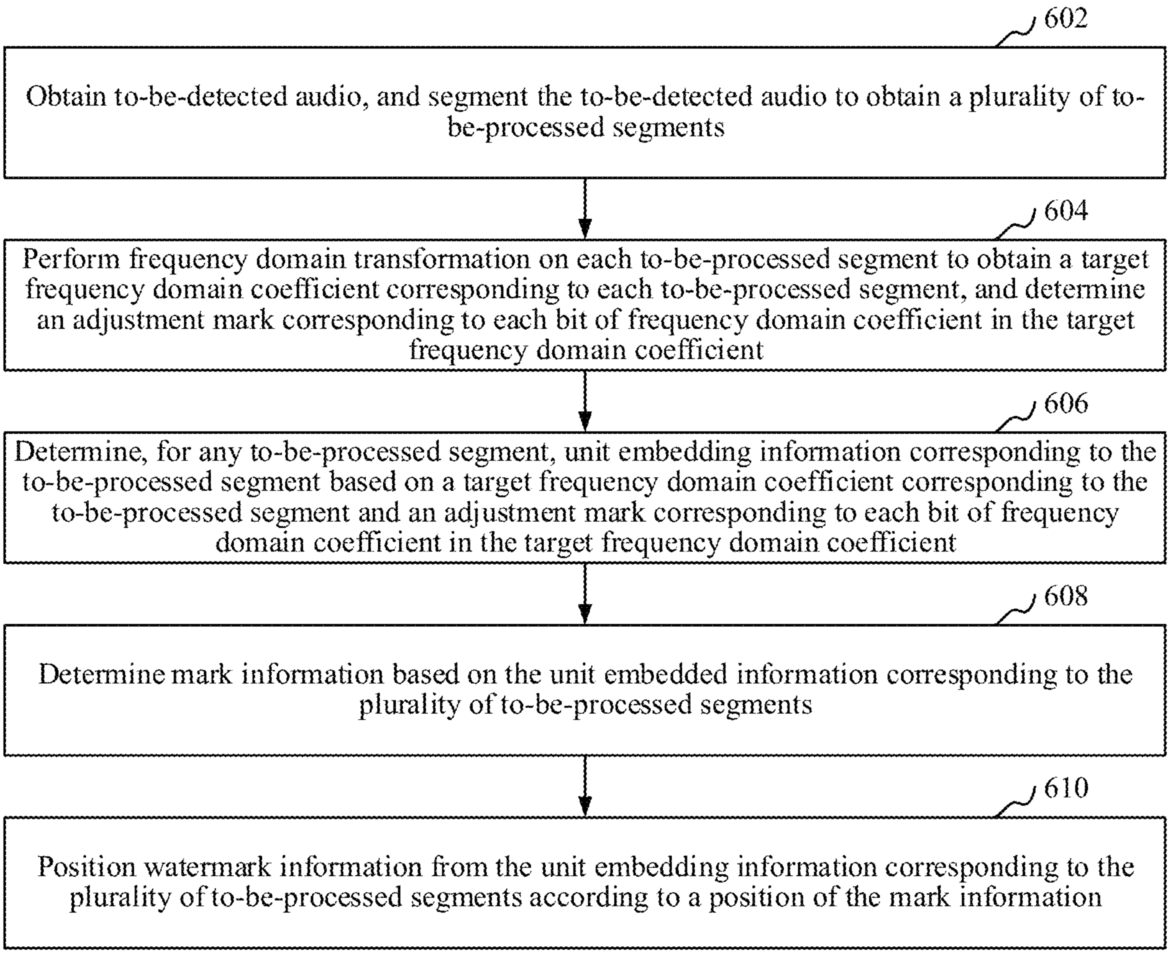
FIG. 6 is a schematic flowchart of an audio watermark detection method according to some embodiments.

Some embodiments further provide an audio watermark detection method. The method may be applied to a terminal or a server, or may be collaboratively performed by the terminal and the server. As shown in FIG. 6, an example in which the method is applied to a computer device is used for description below. The computer device may be the terminal or the server. The method includes the following operations.

Operation 602: Obtain to-be-detected audio, and segment the to-be-detected audio to obtain a plurality of to-be-processed segments.

The computer device may obtain to-be-processed audio from a local or a network, and segment the to-be-processed audio into a plurality of audio segments having a preset length. The preset length is greater than or equal to a length of to-be-embedded information.

In some embodiments, according to the length of the to-be-embedded information, the computer device traverses the to-be-detected audio according to the length of the to-be-embedded information according to a preset step size and by using a sliding window of a same length. A length of the preset step size may be set according to an actual requirement, and different step sizes may be configured for coordinating detection accuracy and detection efficiency.

Operation 604: Perform frequency domain transformation on each to-be-processed segment to obtain a target frequency domain coefficient corresponding to each to-be-processed segment, and determine an adjustment mark corresponding to each bit of frequency domain coefficient in the target frequency domain coefficient.

For each to-be-processed segment, the computer device performs frequency domain transformation on the to-be-processed segment, and obtains the target frequency domain coefficient corresponding to each to-be-processed segment through calculation. The target frequency domain coefficient is a plurality of bits of frequency domain coefficients obtained by performing frequency domain transformation on the to-be-processed segment, and each bit of frequency domain coefficient represents a weight of each audio component of the to-be-processed segment mapped in frequency domain. The target frequency domain coefficient may be a frequency domain coefficient after a watermark (for example, superimposed with audio corresponding to adjustment information of a frequency domain coefficient) is embedded, or may be an original frequency domain coefficient that has not been changed (for example, the to-be-detected audio is not embedded with watermark information).

For each to-be-processed segment, after determining the corresponding target frequency domain coefficient, the computer device may determine, based on an adjustment mask, an adjustment mark corresponding to each bit of frequency domain coefficient. Each adjustment mark is preset with a corresponding initial adjustment mode, and the initial adjustment mode corresponding to each adjustment mark is, for example, one of up, down, or keep. In some embodiments, the adjustment mask is an adjustment mask used in an audio watermark processing process, and L adjustment marks in a sequence are recorded in the adjustment mask.

Operation 606: Determine, for any to-be-processed segment, unit embedding information corresponding to the to-be-processed segment based on a target frequency domain coefficient corresponding to the to-be-processed segment and an adjustment mark corresponding to each bit of frequency domain coefficient in the target frequency domain coefficient.

For any to-be-processed segment, the computer device determines a target adjustment mode based on a target frequency domain coefficient corresponding to the to-be-processed segment and an adjustment mark corresponding to each bit of frequency domain coefficient in the target frequency domain coefficient and with reference to an initial adjustment mode corresponding to the adjustment mark and according to a frequency domain energy value corresponding to one or more frequency domain coefficients corresponding to different types of adjustment marks, and further determines unit embedding information corresponding to each to-be-processed segment based on the determined target adjustment mode.

For example, when a watermark is embedded, up processing and down processing are preset on the adjustment mark. During watermark detection, the computer device may select one or more frequency domain coefficients whose mark is up from the target frequency domain coefficient and may calculate a frequency domain energy mean value, may select one or more frequency domain coefficients whose mark is down from the target frequency domain coefficient and may calculate a frequency domain energy mean value, may compare a difference between the two frequency domain energy mean values to determine the target adjustment mode, and may further determines the unit embedding information corresponding to each to-be-processed segment.

When a value type of the unit embedding information is determined reversely herein, the value type of the unit embedding information corresponds to setting of the value type of the unit embedding information in a watermark embedding process. For example, when the value type of the unit embedding information in the watermark embedding process is set to a first type, up processing is still performed when the adjustment mark is up, and down processing is still performed when the adjustment mark is down. When the value type of the unit embedding information in the watermark embedding process is set to a second type, down processing is performed when the adjustment mark is up processing, and up processing is performed if the adjustment mark is down processing. In a watermark detection process, a frequency domain energy mean value corresponding to a first adjustment mark is calculated to obtain a first energy mean value, and a frequency domain energy mean value corresponding to a second adjustment mark is calculated to obtain a second energy mean value. The unit embedding information is determined according to magnitudes of the first energy mean value and the second energy mean value. For example, if a first energy mean value dbA is greater than a second energy mean value dbB, it is determined that the unit embedding information of the to-be-processed segment is 1, and if dbA is less than or equal to dbB, it is determined that the unit embedding information of the to-be-processed segment is 0.

Operation 608: Determine mark information based on the unit embedding information corresponding to the plurality of to-be-processed segments.

The computer device performs traversal to obtain the plurality of to-be-processed segments. The computer device may detect, according to the plurality of to-be-processed segments, whether the mark information exists or whether the mark information is correct.

A mode in which the computer device detects the mark information corresponds to a mode in which the mark information is set when the watermark is embedded. For example, when the watermark is embedded, the to-be-embedded information is constructed in the mode shown in FIG. 3. The to-be-embedded information includes first mark information SYNC1, second mark information SYNC2, and watermark information WM in sequence, and the first mark information SYNC1 is equal to the second mark information SYNC2. During watermark detection, the computer device may detect whether first two pieces of unit embedding information of the preset length (corresponding to a length of the mark information) are equal, and therefore may detect whether the mark information exists.

In some embodiments, when the watermark is embedded, a difference between the first mark information SYNC1 and the second mark information SYNC2 is set to be less than a preset threshold. During watermark detection, the computer device may detect whether a similarity between first two pieces of unit embedding information of the preset length satisfies a similarity condition (for example, the difference is less than the preset threshold), and therefore may detect whether the mark information exists.

In some embodiments, when the watermark is embedded, the to-be-embedded information is set to include the first mark information SYNC1, the watermark information WM, and the second mark information SYNC2 in sequence. During watermark detection, the computer device may detect whether a similarity between a first piece of unit embedding information of the preset length (corresponding to the length of the mark information) and a third piece of unit embedding information of the preset length satisfies a similarity condition, and therefore may detect whether the mark information exists.

Operation 610: Position watermark information from the unit embedding information corresponding to the plurality of to-be-processed segments according to a position of the mark information.

After detecting the mark information, the computer device determines a position of watermark information according to a relative position between the mark information and the watermark information in the pre-constructed to-be-embedded information and according to the position of the mark information, and further positions the watermark information from the unit embedding information corresponding to the plurality of to-be-processed segments.

For example, the computer device compares whether first N1 pieces of unit embedding information (corresponding to an SYNC1 part) are equal to immediately following N1 pieces of unit embedding information (corresponding to an SYNC2 part). If two parts are equal, it is determined that the mark information is detected. The computer device may determine last N2 pieces of unit embedding information as the watermark information. For another example, the computer device compares whether first N1 pieces of unit embedding information (corresponding to an SYNC1 part) are equal to last N1 pieces of unit embedding information (corresponding to an SYNC2 part). If two parts are equal, it is determined that the mark information is detected. The computer device may determine N2 pieces of unit embedding information between the two parts of mark information as the watermark information.

In the foregoing audio watermark detection method, the to-be-detected audio is divided to obtain the plurality of to-be-processed segments, frequency domain transformation is respectively performed on the plurality of to-be-processed segments to obtain the target frequency domain coefficients, based on the target frequency domain coefficient corresponding to each to-be-processed segment, the unit embedding information corresponding to each to-be-processed segment is determined through reversing, the mark information is determined therefrom, and finally, the watermark information is positioned according to the position of the mark information, so that the watermark information can be accurately detected. Because the watermark information may be embedded in the frequency domain by using frequency domain transform, during detection, after frequency domain transformation may be performed on the to-be-processed segment, the mark information may be determined by using the robustness of the frequency domain coefficient energy mean value, so that the detection rate and the robustness are high in the face of a time domain attack.

In some embodiments, the for any to-be-processed segment, determining unit embedding information corresponding to the to-be-processed segment based on the target frequency domain coefficient corresponding to the to-be-processed segment and an adjustment mark corresponding to each bit of frequency domain coefficient in the target frequency domain coefficient includes: for any to-be-processed segment, determining frequency domain energy values corresponding to different adjustment marks based on the target frequency domain coefficient corresponding to the to-be-processed segment and the adjustment mark corresponding to each bit of frequency domain coefficient in the target frequency domain coefficient; and determining, based on the frequency domain energy values corresponding to the different adjustment marks, the unit embedding information corresponding to the to-be-processed segment.

For each to-be-processed segment, the computer device calculates, based on the target frequency domain coefficient of the to-be-processed segment and the adjustment mark corresponding to each bit of frequency domain coefficient in the target frequency domain coefficient of the to-be-processed segment, frequency domain energy values of one or more target frequency domain coefficients corresponding to the same adjustment mark. The computer device calculates the frequency domain energy values of the one or more target frequency domain coefficients, which may be calculating an absolute value of each bit of frequency domain coefficient in the target frequency domain coefficient, and using a sum of the absolute values as the frequency domain energy value. However, the disclosure is not limited thereto, and for example, may be a square difference, a square sum, a weighted sum, a standard deviation, or the like.

Therefore, the computer device determines, based on the frequency domain energy values of different adjustment marks, the target adjustment modes corresponding to the different adjustment marks through reversing, thereby determining the unit embedding information corresponding to the to-be-processed segment.

In some embodiments, the unit embedding information is restored through the frequency domain energy value of the frequency domain coefficient, which fully utilizes the stability of the frequency domain energy, can still accurately detect the watermark information after being subjected to a time domain attack, and has the high robust.

In some embodiments, the adjustment mark includes a first adjustment mark and a second adjustment mark. For example, the first adjustment mark corresponds to up processing, and the second adjustment mark corresponds to down processing. Correspondingly, the determining, based on the frequency domain energy values corresponding to the different adjustment marks, the unit embedding information corresponding to the to-be-processed segment, and the determining, based on the frequency domain energy values of the different adjustment marks in each to-be-processed segment, the unit embedding information corresponding to each to-be-processed segment includes: determining, based on the frequency domain energy values corresponding to the different adjustment marks, a frequency domain energy mean value corresponding to the first adjustment mark and a frequency domain energy mean value corresponding to the second adjustment mark; and determining the unit embedding information corresponding to the to-be-processed segment based on a difference between the frequency domain energy mean value corresponding to the first adjustment mark and the frequency domain energy mean value corresponding to the second adjustment mark.

Any one of the plurality of to-be-processed segments may be used as a current to-be-processed segment, and the computer device may determine a frequency domain energy mean value corresponding to different adjustment marks in the current to-be-processed segment. For example, the computer device selects, for the target frequency domain coefficient corresponding to the current to-be-processed segment, one or more frequency domain coefficients marked as the first adjustment mark from the target frequency domain coefficient, and calculates a frequency domain energy mean value of the one or more frequency domain coefficients; and selects one or more frequency domain coefficients marked as the second adjustment mark from the target frequency domain coefficient, and calculates a frequency domain energy mean value of the one or more frequency domain coefficients.

The computer device compares the frequency domain energy mean value corresponding to the first adjustment mark with the frequency domain energy mean value corresponding to the second adjustment mark, and determines, based on a difference between the frequency domain energy mean value corresponding to the first adjustment mark and the frequency domain energy mean value corresponding to the second adjustment mark, the target adjustment mode corresponding to each adjustment mark.

For example, for each bit of frequency domain coefficient in the target frequency domain coefficient, the computer device selects, a frequency domain coefficient with the adjustment mark being up processing (up) to calculate a first energy mean value dbA, selects a frequency domain coefficient with the adjustment mark being down processing (down) to calculate a second energy mean value dbB, compares the first energy mean value dbA with the second energy mean value dbB, and determines, based on magnitudes of the first energy mean value dbA and the second energy mean value dbB, the target adjustment mode corresponding to each adjustment mark. Therefore, the computer device determines the unit embedding information corresponding to the current to-be-processed segment based on the target adjustment mode corresponding to each adjustment mark. For example, in a case that dbA is greater than dbB, it is determined that the unit embedding information of the to-be-processed segment is 1; and in a case that dbA is less than or equal to dbB, it is determined that the unit embedding information of the to-be-processed segment is 0.

In some embodiments, the unit embedding information is restored through the frequency domain energy mean value of the frequency domain coefficient, which fully utilizes the stability of the frequency domain energy, can still accurately detect the watermark information after being subjected to a time domain attack, and has the high robust.

In some embodiments, the determining mark information based on the unit embedding information corresponding to the plurality of to-be-processed segments includes: extracting, in the unit embedding information corresponding to the plurality of to-be-processed segments, at least two segments of unit embedding information sequences having a preset length from a preset position, where each segment of unit embedding information sequence includes a plurality of pieces of unit embedding information; and obtaining, based on the at least two segments of extracted unit embedding information sequences, the mark information through restoration.

The computer device may extract, for the unit embedding information corresponding to the plurality of to-be-processed segments, the at least two segments of unit embedding information sequences having the preset length from a preset position. The preset position corresponds to the position of the mark information in the to-be-embedded information when the watermark is embedded. For example, when the watermark is embedded, the to-be-embedded information is set to be first mark information having a length N1, second mark information having the length N1, and watermark information having a length N2 in sequence. During watermark detection, the computer device may extract, from the plurality of unit embedding information, the first two segments of unit embedding information sequences having the length N1 respectively, to detect the mark information.

Therefore, the computer device compares the two segments of extracted unit embedding information sequences, to restore the mark information. For example, the computer device compares whether a first segment of unit embedding information sequence (first N1 pieces of unit embedding information) is equal to an immediately following second segment of unit embedding information sequence (immediately following the N1 pieces of unit embedding information), and determines that the mark information is detected if the first segment of unit embedding information sequence is equal to the second segment of unit embedding information sequence.

For another example, in some embodiments, the at least two segments of unit embedding information sequences having the preset length include a first restoration sequence and a second restoration sequence, and the obtaining, based on the at least two segments of extracted unit embedding information sequences, the mark information through restoration includes: comparing the first restoration sequence with the second restoration sequence; and determining the mark information based on the first restoration sequence and the second restoration sequence in a case that a similarity between the first restoration sequence and the second restoration sequence is less than a threshold.

The computer device may compare whether the similarity between the first restoration sequence and the second restoration sequence satisfies a similarity condition, and may determine that the mark information is detected if the similarity is less than a preset threshold.

The similarity between the first restoration sequence and the second restoration sequence may be, for example, that a carry difference between the first restoration sequence and the second restoration sequence is less than the threshold, the similarity between the first restoration sequence and the second restoration sequence regularly transforms, a difference between each bit of unit embedding information in the first restoration sequence and each bit of unit embedding information in the second restoration sequence is less than the threshold, or a quantity of pieces of unit embedding information at the same position but with different value types in the first restoration sequence and the second restoration sequence is less than the threshold.

In some embodiments, the unit embedding information sequence with the same length and the same position as the mark information is extracted, and whether the mark information is detected is determined based on the at least two segments of unit embedding information sequences. Therefore, in a case that the mark information is detected, the position of the watermark information is positioned, the watermark information is extracted, and the accuracy may be higher. In addition, by embedding the mark information and the watermark information into the audio together, in a case that the audio is cropped or attacked in the time domain, the stability of the frequency domain coefficient energy can still be used for calculation, so that the position of the watermark information is accurately positioned, and the resistance to attack is higher.

In some embodiments, the positioning, according to a position of the mark information, watermark information from the unit embedding information corresponding to the plurality of to-be-processed segments includes: using, according to the position of the mark information, a plurality of pieces of unit embedding information that are adjacent to the mark information and whose lengths reach a preset length in the unit embedding information corresponding to the plurality of to-be-processed segments as the watermark information.

Because the relative position between the mark information and the watermark information in the to-be-embedded information is known, during watermark detection, according to the position of the mark information, the computer device can position the position of the watermark information. The computer device may use, according to the position of the mark information, the plurality of pieces of unit embedding information that are adjacent to the mark information and whose lengths reach the preset length in the unit embedding information corresponding to the plurality of to-be-processed segments as the watermark information.

For example, when the watermark is embedded, the to-be-embedded information is set to be first mark information having a length N1, second mark information having the length N1, and watermark information having a length N2 in sequence. During watermark detection, the computer device may use last N2 pieces of unit embedding information as the watermark information.

In some embodiments, the watermark information is positioned according to the position of the mark information. When the mark information cannot be detected, it can be determined that the audio is corrupted or is not embedded with watermark information. The sequences corresponding to the watermark information are not required to be compared one by one. In addition, the watermark information may be determined based on positioning the mark information, which can be used to ensure accuracy of the extracted watermark information.

To improve the detection efficiency, when the to-be-detected audio is detected, the computer device may traverse in sequence in a form of a sliding window. When correct mark information is detected at any moment, traversal may be stopped, and the watermark information is detected according to the position of the mark information. In some embodiments, when a timeliness requirement is not high or a requirement for the detection accuracy is high, the computer device may completely detect the to-be-detected audio once, for example. Because the to-be-embedded information may be repeatedly cyclically embedded into the to-be-detected audio, a plurality of pieces of mark information may be detected. The computer device may perform voting processing on each bit of a plurality of segments of unit embedding information sequences, and use the value type of the unit embedding information with a higher proportion as a final value type of the unit embedding information at this bit.

The detected watermark information may be configured for sourcing the audio, copyright verification of the audio, or the like. In some embodiments, the method further includes: extracting positioned watermark information; and obtaining source watermark information, comparing the extracted watermark information with the source watermark information, and performing verification on a release source of the to-be-detected audio based on a comparison result.

The computer device may extract the positioned watermark information based on the position of the watermark information being determined. According to the extracted watermark information, the computer device compares the extracted watermark information with the source watermark information, and determines, based on the comparison result, whether the corresponding to-be-detected audio is embedded with the source watermark information, so that verification can be performed on the release source of the to-be-detected audio. The source watermark information is, for example, preset watermark information corresponding to a service.

For example, for a music application program, the music application program has a copyright for audio. When a user shares the audio through the music application program, the music application program embeds source watermark information for the shared audio. After to-be-detected audio is subsequently obtained, the computer device detects watermark information of the to-be-detected audio, and compares whether the watermark information is the same as the source watermark information. If the watermark information is the same as the source watermark information, it means that the to-be-detected audio is the audio transmitted from the music application program. A release source of the to-be-detected audio may be the music application program. When the computer device determines that the watermark information of the to-be-detected audio is different from the source watermark information, or no watermark information is detected, it means that the to-be-detected audio is not transmitted from the music application program. In a case that the music application program has a dedicated copyright for the audio, it may be further determined that the to-be-detected audio is unauthorized audio.

In some embodiments, verification is performed on the audio work based on the watermark information, so that an audio work can be prevented from being disseminated without authorization, a copyright of the audio work can be protected, and rights and interests of an author of the audio work can be ensured.

Further provided is an application scenario, and the foregoing audio watermark detection method may be applied to the application scenario as follows. A server obtains to-be-detected audio. The to-be-detected audio may be uploaded by a terminal or obtained by the server from a network. The server obtains a plurality of to-be-processed segments by dividing the to-be-detected audio, and obtains a target frequency domain coefficient corresponding to each to-be-processed segment by performing frequency domain transformation on each to-be-processed segment, thereby determining unit embedding information corresponding to each to-be-processed segment. The server determines mark information based on the unit embedding information corresponding to the plurality of to-be-processed segments, and positions, according to a position of the mark information, watermark information from the unit embedding information corresponding to the plurality of to-be-processed segments. Based on the determined watermark information, the server performs traceability or verification on the to-be-detected audio, or determines whether the to-be-detected audio is tampered with, attacked, or the like. However, the disclosure is not limited thereto. The audio watermark detection method provided in some embodiments may further be applied to other application scenarios, such as online livestreaming, online classroom, audio sharing, and the like.

Descriptions are provided below with reference to a watermark embedding process and a watermark detection process.

For example, it is assumed that the to-be-embedded information is a binary bit sequence W, which is divided into three parts: first mark information SYNC1, second mark information SYNC2, and watermark information WM. The first mark information SYNC1 is equal to the second mark information SYNC2, and may be referred to as a synchronization code. The watermark information WM is an actual embedded watermark.

Figure 7:
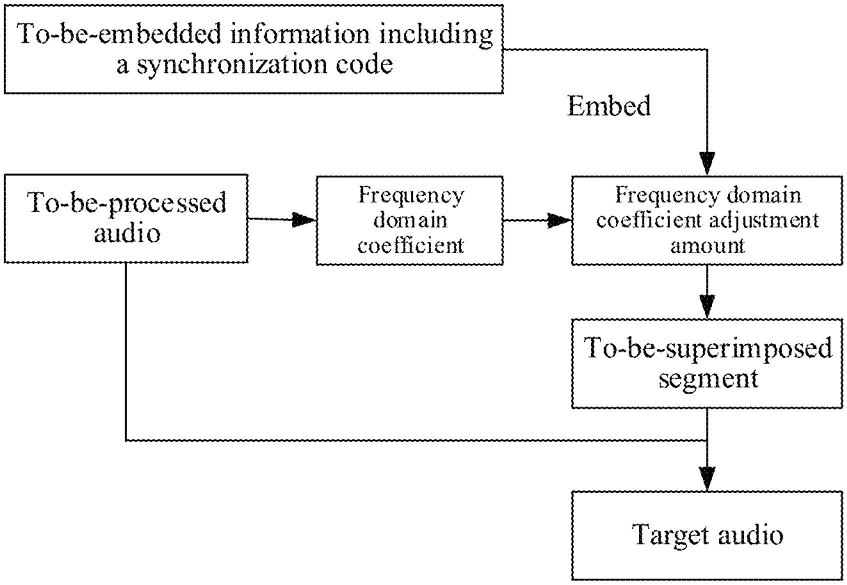
FIG. 7 is a schematic flowchart of an audio watermark processing method according to some embodiments.

In the watermark embedding process, as shown in FIG. 7, the computer device first divides the to-be-processed audio into a plurality of audio segments having a length L, performs Fourier transform on each audio segment, and calculates a frequency domain coefficient, such as an FFT coefficient, of each audio segment. For example, the computer device determines an adjustment mask matching each audio segment. For example, among a plurality of adjustment marks in the adjustment mask, the computer device randomly extracts L/4 adjustment marks to be up processing (up), L/4 adjustment marks to be down processing (down), and the remaining adjustment marks to be keeping unchanged (keep). Quantities of various types of adjustment marks are determined herein, and during calculation of a frequency domain energy value during subsequent watermark detection, a corresponding calculation is to be performed based on the quantities.

For any audio segment, when the allocated unit embedding information is 1, for each frequency domain coefficient in the original frequency domain coefficient corresponding to the audio segment, the computer device performs up processing on the frequency domain coefficient if the adjustment mark corresponds to up processing, and performs down processing on the frequency domain coefficient if the adjustment mark corresponds to down processing. Conversely, when the allocated unit embedding information is 0, for each frequency domain coefficient in the original frequency domain coefficient corresponding to the audio segment, the computer device performs down processing on the frequency domain coefficient if the adjustment mark corresponds to up processing, and performs up processing on the frequency domain coefficient if the adjustment mark corresponds to down processing. The computer device may obtain an adjustment amount of each frequency domain coefficient.

Further, the computer device performs inverse Fourier transform on the adjustment amount of the frequency domain coefficient, to obtain a time domain modification difference of the audio including the watermark information, for example, a to-be-superimposed segment. The to-be-superimposed segment is the audio whose adjustment amount corresponds to the time domain. The computer device windows the to-be-superimposed segment and superimposes the to-be-superimposed segment with a corresponding audio segment, thereby obtaining a target audio segment. For all audio segments, the computer device performs the foregoing processing. Therefore, for the entire audio, each bit of to-be-embedded information can be cyclically embedded, and finally, the target audio segments are spliced in sequence, to obtain complete target audio embedded with a watermark.

Figure 8:
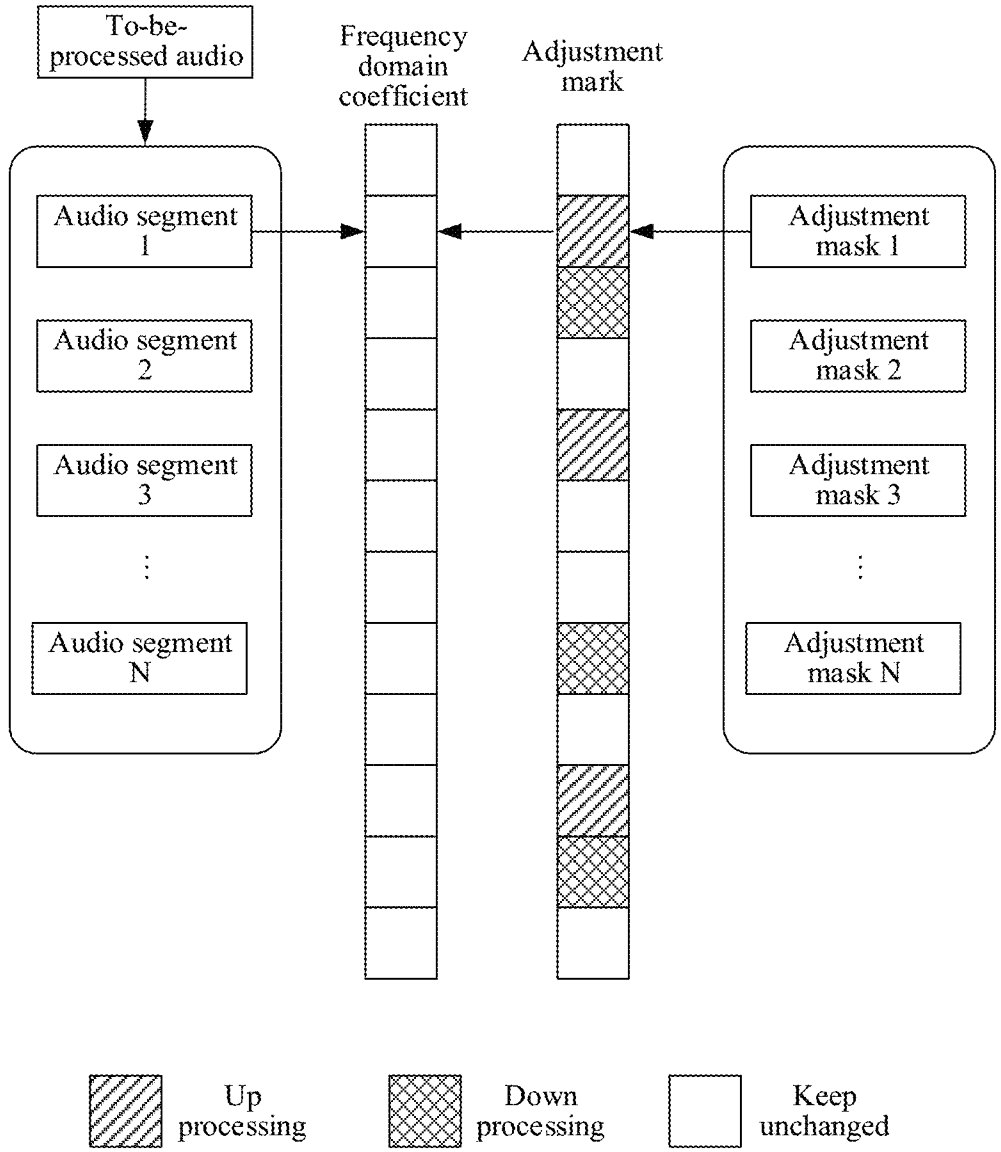
FIG. 8 is a schematic diagram of a principle of an adjustment mode for determining a frequency domain coefficient according to some embodiments.

However, in a bit embedding processing on any audio segment, as shown in FIG. 8, the computer device divides the to-be-processed audio, to obtain an audio segment 1, an audio segment 2, an audio segment 3, . . . , and an audio segment N. Using the audio segment 1 as an example, the computer device performs frequency domain transformation to calculate a frequency domain coefficient, for example, an FFT coefficient. In addition, the computer device obtains an adjustment mask corresponding to the audio segment 1, for example, an adjustment mask 1. Adjustment marks respectively corresponding to each bit of frequency domain coefficient included in the adjustment mask 1 are shown in FIG. 8.

For example, for a first-bit frequency domain coefficient, an adjustment mark at a corresponding position in the adjustment mask 1 represents that the adjustment mode is keeping unchanged. Regardless of whether the unit embedding information embedded in the audio segment 1 is 1 or 0, the computer device may keep the frequency domain coefficient unchanged.

For a second-bit frequency domain coefficient, an adjustment mark at a corresponding position in the adjustment mask 1 represents that the adjustment mode is up processing. When the unit embedding information embedded in the audio segment 1 is 1, the computer device may determine that a final adjustment mode of the second-bit frequency domain coefficient is up processing; and when the unit embedding information embedded in the audio segment 1 is 0, the computer device may determine that the final adjustment mode of the second-bit frequency domain coefficient is down processing.

For a third-bit frequency domain coefficient, an adjustment mark at a corresponding position in the adjustment mask 1 represents that the adjustment mode is down processing. When the unit embedding information embedded in the audio segment 1 is 1, the computer device may determine that a final adjustment mode of the second-bit frequency domain coefficient is down processing; and when the unit embedding information embedded in the audio segment 1 is 0, the computer device may determine that the final adjustment mode of the second-bit frequency domain coefficient is up processing.

However, in the subsequent watermark detection process, the computer device first detects the first mark information SYNC1 and the second mark information SYNC2, and determines whether the first mark information SYNC1 is equal to the second mark information SYNC2. If the first mark information SYNC1 is equal to the second mark information SYNC2, it means that the audio segments from which the watermarks are extracted are correctly synchronized, and the watermark information WM is extracted.

Figure 9:
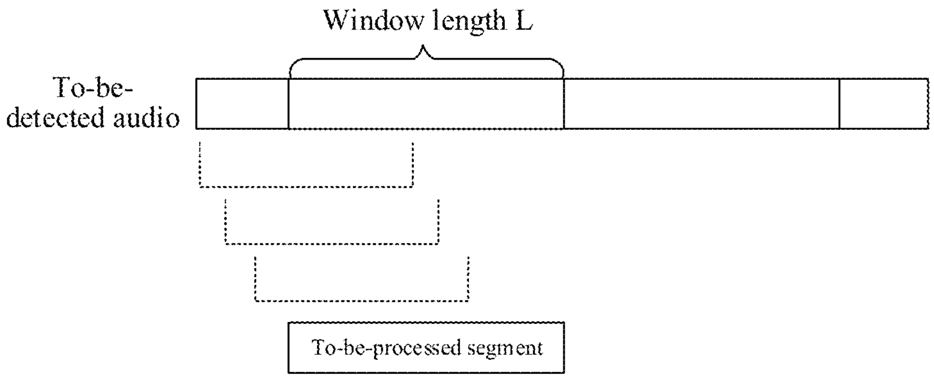
FIG. 9 is a schematic flowchart of an audio watermark detection method according to some embodiments.

As shown in FIG. 9, the computer device traverses the to-be-detected audio with a preset window length L and a step size S, where the window length L=2*N1+N2. N1 is a length of the mark information SYNC1 and SYNC2, and N2 is a length of the watermark information WM. It is assumed that the to-be-detected audio is under attack, for example, a part is cropped, and the computer device cannot detect the complete to-be-embedded information several times at the beginning of the traversal.

Figure 10:
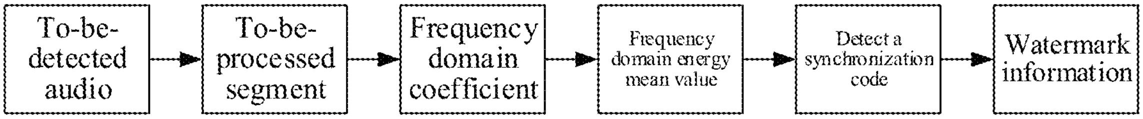
FIG. 10 is a schematic flowchart of an audio watermark detection method according to still some embodiments.

As shown in FIG. 10, for the to-be-detected audio, when a to-be-processed segment is detected, the computer device first performs frequency domain transformation to obtain frequency domain coefficients corresponding to the to-be-processed segment, selects frequency domain coefficients with the adjustment mark being up processing (up) to calculate an energy mean value dbA, and selects frequency domain coefficients with the adjustment mark being down processing (down) to calculate an energy mean value dbB. The calculation of the energy mean values by the computer device may be, for example, calculation of a mean value of absolute values of the frequency domain coefficients. Therefore, the computer device compares magnitudes of the energy mean values dbA and dbB. If dbA is greater than dbB, it is determined that the unit embedding information of the to-be-processed segment is 1; and if dbA is less than or equal to dbB, it is determined that the unit embedding information of the to-be-processed segment is 0.

The value type of the unit embedding information obtained through restoration may be related to the setting of the unit embedding information when the watermark is embedded. The computer device repeats the foregoing operations until the unit embedding information sequence of a length of the to-be-embedded information is extracted.

Further, as shown in FIG. 10, for the unit embedding information sequence, the computer device compares whether first N1 pieces of unit embedding information (the synchronization code corresponding to the SYNC1 part) and immediately following N1 pieces of unit embedding information (the synchronization code corresponding to the SYNC2 part) are equal. If two parts are equal, it is determined that the mark information is detected. The computer device may determine last N2 pieces of unit embedding information as the watermark information. Therefore, the watermark of the to-be-detected audio is successfully detected. If the mark information is not detected this time, the computer device traverses a next to-be-processed segment, and repeats the foregoing operations.

Therefore, the audio is embedded with the watermark through the foregoing mode. By using the robustness of the energy mean value of the audio in the frequency domain to scaling, it is resistant to synchronization attacks such as cropping and time domain scaling, and the robust is high. By encoding the to-be-embedded information, two identical random 0, 1 bit sequences are generated as the mark information, and the watermark information is set after the mark information. During detection, it is determined whether the two pieces of mark information are equal, and the position of the watermark information is positioned accordingly, so that the watermark can be positioned more accurately, and the accuracy is higher. In addition, the watermark is embedded in the frequency domain by using the robustness of the frequency domain coefficient energy mean value, so that the watermark information can also be correctly detected after recovery for a time domain attack. In addition, instead of directly modifying the frequency domain coefficient, the adjustment amount of the frequency domain coefficient is converted into the time domain and windowing superimposition is performed, so that the sound quality is less affected.

Operations in flowcharts involved in some embodiments are displayed in sequence based on indication of arrows, but the operations are not necessarily performed in sequence based on a sequence indicated by the arrows. Unless indicated clearly, the operations do not need to be performed in a strict sequence, and can be performed in another sequence. In addition, at least some operations in the flowcharts involved in some embodiments may include a plurality of operations or a plurality of stages, and these operations or stages are not necessarily performed at a same moment, but may be performed at different moments. The operations or stages are not necessarily performed in sequence, but may be performed by turn or with other operations or at least part of operations or stages in other operations.

Some embodiments provide an audio watermark processing apparatus for implementing the foregoing audio watermark processing method. The apparatus, according to some embodiments, may be similar to the method, according to some embodiments. Therefore, reference may also be made to the descriptions of the audio watermark processing method.

Figure 11:
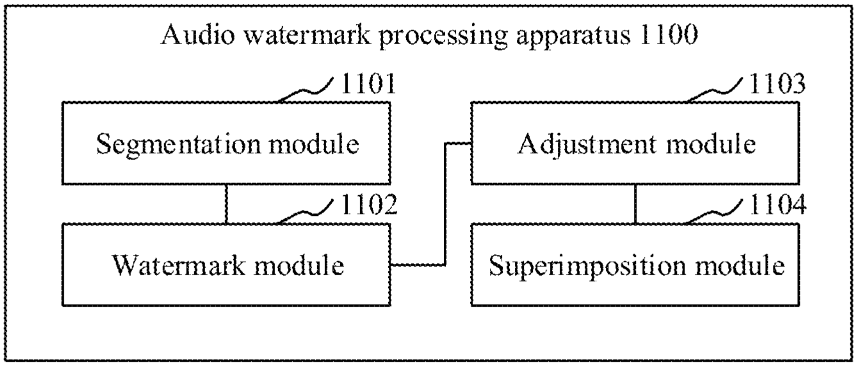
FIG. 11 is a structural block diagram of an audio watermark processing apparatus according to some embodiments.

In some embodiments, as shown in FIG. 11, an audio watermark processing apparatus 1100 is provided, including: a segmentation module 1101, a watermark module 1102, an adjustment module 1103, and a superimposition module 1104.

The segmentation module 1101 is configured to obtain to-be-detected audio, segment the to-be-detected audio to obtain a plurality of to-be-processed segments, and determine an original frequency domain coefficient corresponding to each audio segment.

The watermark module 1102 is configured to obtain to-be-embedded information, the to-be-embedded information including mark information and watermark information, the mark information being configured for positioning the watermark information.

The adjustment module 1103 is configured to determine, for any audio segment based on the to-be-embedded information, adjustment information corresponding to an original frequency domain coefficient of the audio segment.

The adjustment module 1103 is further configured to perform inverse frequency domain transformation on the adjustment information, to obtain a to-be-superimposed segment corresponding to the audio segment.

The superimposition module 1104 is configured to superimpose, for any audio segment, the audio segment and a corresponding to-be-superimposed segment, to obtain a target audio segment, and obtain, based on a plurality of target audio segments, target audio embedded with the watermark information.

In some embodiments, the mark information in the to-be-embedded information includes at least first mark information and second mark information, and the first mark information and the second mark information satisfy a preset similarity condition.

In some embodiments, the original frequency domain coefficient includes L bits of frequency domain coefficients, L is a positive integer greater than 1, the to-be-embedded information includes a plurality of pieces of unit embedding information, and the adjustment module is further configured to: allocate a piece of unit embedding information to each audio segment from the to-be-embedded information; determine, for any audio segment, an adjustment mark matching each of L bits of frequency domain coefficients of the audio segment; determine, based on the unit embedding information allocated for the audio segment, target adjustment modes respectively corresponding to L adjustment marks; and determine, according to the target adjustment modes respectively corresponding to the L adjustment marks, the adjustment information corresponding to the original frequency domain coefficient of the audio segment.

In some embodiments, the adjustment module is further configured to determine, according to a sequence of the unit embedding information in the to-be-embedded information, current unit embedding information from the to-be-embedded information; determine, according to a time sequence of the audio segment, a current audio segment from the plurality of audio segments; allocate the current unit embedding information to the current audio segment; use a next piece of unit embedding information as current unit embedding information of a next allocation, and use a next audio segment of the current audio segment as a current audio segment of the next allocation; return to the operation of allocating the current unit embedding information to the current audio segment and continue to perform the operation until last-bit unit embedding information in the to-be-embedded information is allocated; and use first-bit unit embedding information in the to-be-embedded information as current unit embedding information of a next cycle, and perform a plurality of cycle allocations until all audio segments are allocated with the unit embedding information.

In some embodiments, the adjustment module is further configured to obtain, for any audio segment, an adjustment mask corresponding to the audio segment, where the adjustment mask includes the L adjustment marks; and use an $l^{th}$ adjustment mark in the adjustment mask as an adjustment mark of an $l^{th}$ bit of frequency domain coefficient in L bits of frequency domain coefficients of the audio segment, where l is a positive integer greater than 1 and less than or equal to L.

In some embodiments, a value type of the unit embedding information includes a first type and a second type, and for any adjustment mark, an adjustment direction of a target adjustment mode determined based on the unit embedding information of the first type is opposite to an adjustment direction of a target adjustment mode determined based on the unit embedding information of the second type.

In some embodiments, the adjustment module is further configured to determine a value type of the unit embedding information allocated for the audio segment; in a case that the value type is the first type, use initial adjustment modes respectively corresponding to the L adjustment marks as the target adjustment modes respectively corresponding to the L adjustment marks; and in a case that the value type is the second type, perform reverse processing on the initial adjustment modes respectively corresponding to the L adjustment marks, to obtain the target adjustment modes respectively corresponding to the L adjustment marks. In some embodiments, the superposition module is further configured to determine a time sequence corresponding to each of the plurality of target audio segments; splice the plurality of target audio segments according to the time sequence corresponding to each target audio segment, to obtain the target audio, where the target audio is embedded with the watermark information.

The modules in the foregoing audio watermark processing apparatus may be implemented entirely or partially by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

Some embodiments provide an audio watermark detection apparatus for implementing the foregoing audio watermark detection method. The apparatus, according to some embodiments, may be similar to the method, according to some embodiments. Therefore, reference may also be made to the descriptions of the audio watermark detection method.

Figure 12:
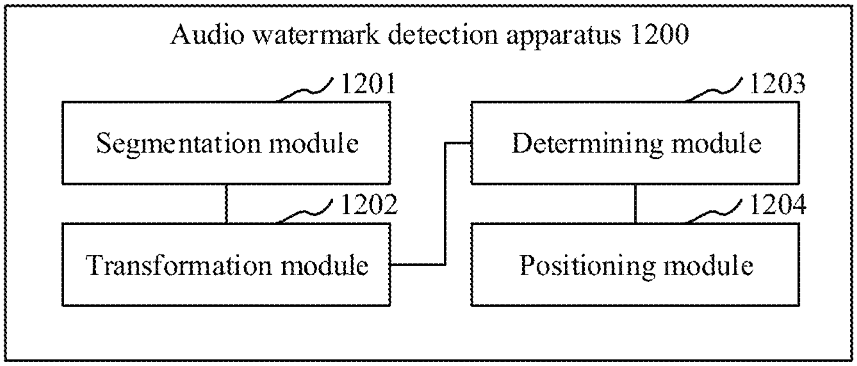
FIG. 12 is a structural block diagram of an audio watermark detection apparatus according to some embodiments.

In some embodiments, as shown in FIG. 12, an audio watermark detection apparatus 1200 is provided, including: a segmentation module 1201, a transformation module 1202, a determining module 1203, and a positioning module 1204.

The segmentation module 1201 is configured to obtain to-be-detected audio, and segment the to-be-detected audio to obtain a plurality of to-be-processed segments.

The transformation module 1202 is configured to perform frequency domain transformation on each to-be-processed segment, to obtain a target frequency domain coefficient corresponding to each to-be-processed segment, and determine an adjustment mark corresponding to each bit of frequency domain coefficient in the target frequency domain coefficient.

The determining module 1203 is configured to determine, for any to-be-processed segment, unit embedding information corresponding to the to-be-processed segment based on a target frequency domain coefficient corresponding to the to-be-processed segment and an adjustment mark corresponding to each bit of frequency domain coefficient in the target frequency domain coefficient.

The determining module 1203 is further configured to determine mark information based on the unit embedding information corresponding to the plurality of to-be-processed segments.

The positioning module 1204 is configured to position, according to a position of the mark information, watermark information from the unit embedding information corresponding to the plurality of to-be-processed segments.

In some embodiments, the determining module is further configured to determine, for any to-be-processed segment, frequency domain energy values corresponding to different adjustment marks based on a target frequency domain coefficient corresponding to the to-be-processed segment and an adjustment mark corresponding to each bit of frequency domain coefficient in the target frequency domain coefficient; and determine, based on the frequency domain energy values corresponding to the different adjustment marks, the unit embedding information corresponding to the to-be-processed segment.

In some embodiments, the adjustment mark includes a first adjustment mark and a second adjustment mark; and the determining module is further configured to determine, based on the frequency domain energy values corresponding to the different adjustment marks, a frequency domain energy mean value corresponding to the first adjustment mark and a frequency domain energy mean value corresponding to the second adjustment mark; and determine the unit embedding information corresponding to the to-be-processed segment based on a difference between the frequency domain energy mean value corresponding to the first adjustment mark and the frequency domain energy mean value corresponding to the second adjustment mark.

In some embodiments, the determining module is further configured to extract, in the unit embedding information corresponding to the plurality of to-be-processed segments, at least two segments of unit embedding information sequences having a preset length from a preset position, where each segment of unit embedding information sequence includes a plurality of pieces of unit embedding information; and obtain, based on the at least two segments of extracted unit embedding information sequences, the mark information through restoration.

In some embodiments, the at least two segments of unit embedding information sequences having the preset length include a first restoration sequence and a second restoration sequence, and the determining module is further configured to compare the first restoration sequence with the second restoration sequence; determine the mark information based on the first restoration sequence and the second restoration sequence in a case that a similarity between the first restoration sequence and the second restoration sequence is less than a threshold.

In some embodiments, the positioning module is further configured to use, according to the position of the mark information, a plurality of pieces of unit embedding information that are adjacent to the mark information and whose lengths reach a preset length in the unit embedding information corresponding to the plurality of to-be-processed segments as the watermark information.

In some embodiments, the apparatus further includes a verification module, configured to extract the positioned watermark information; and obtain source watermark information, comparing extracted watermark information with the source watermark information, and perform verification on a release source of the to-be-detected audio based on a comparison result.

According to some embodiments, each module may exist respectively or be combined into one or more modules. Some modules may be further split into multiple smaller function subunits, thereby implementing the same operations without affecting the technical effects of some embodiments. The modules are divided based on logical functions. In actual applications, a function of one module may be realized by multiple modules, or functions of multiple modules may be realized by one module. In some embodiments, the apparatus may further include other modules. In actual applications, these functions may also be realized cooperatively by the other modules, and may be realized cooperatively by multiple modules.

A person skilled in the art would understand that these "modules" could be implemented by hardware logic, a processor or processors executing computer software code, or a combination of both. The "modules" may also be implemented in software stored in a memory of a computer or a non-transitory computer-readable medium, where the instructions of each unit are executable by a processor to thereby cause the processor to perform the respective operations of the corresponding unit.

In some embodiments, a computer device is provided. The computer device may be the terminal or the server in some embodiments. An example in which the computer device is a server is used for description below. An internal structure diagram thereof may be shown in FIG. 13. The computer device includes a processor, a memory, an input/output (I/O) interface, and a communication interface. The processor, the memory, and the input/output interface are connected through a system bus, and the communication interface is connected to the system bus through the input/output interface. The processor of the computer device is configured to provide computing and control capabilities. The memory of the computer device includes a non-volatile storage medium and an internal memory. The non-volatile storage medium stores an operating system, a computer-readable instruction, and a database. The internal memory provides an environment for running of the operating system and the computer-readable instructions in the non-volatile storage medium. The database of the computer device is configured to store audio data and the like. The input/output interface of the computer device is configured to exchange information between the processor and an external device. The communication interface of the computer device is configured to communicate with an external terminal through a network connection. The computer-readable instruction is executed by the processor to implement an audio watermark processing method or an audio watermark detection method.

Figure 13:
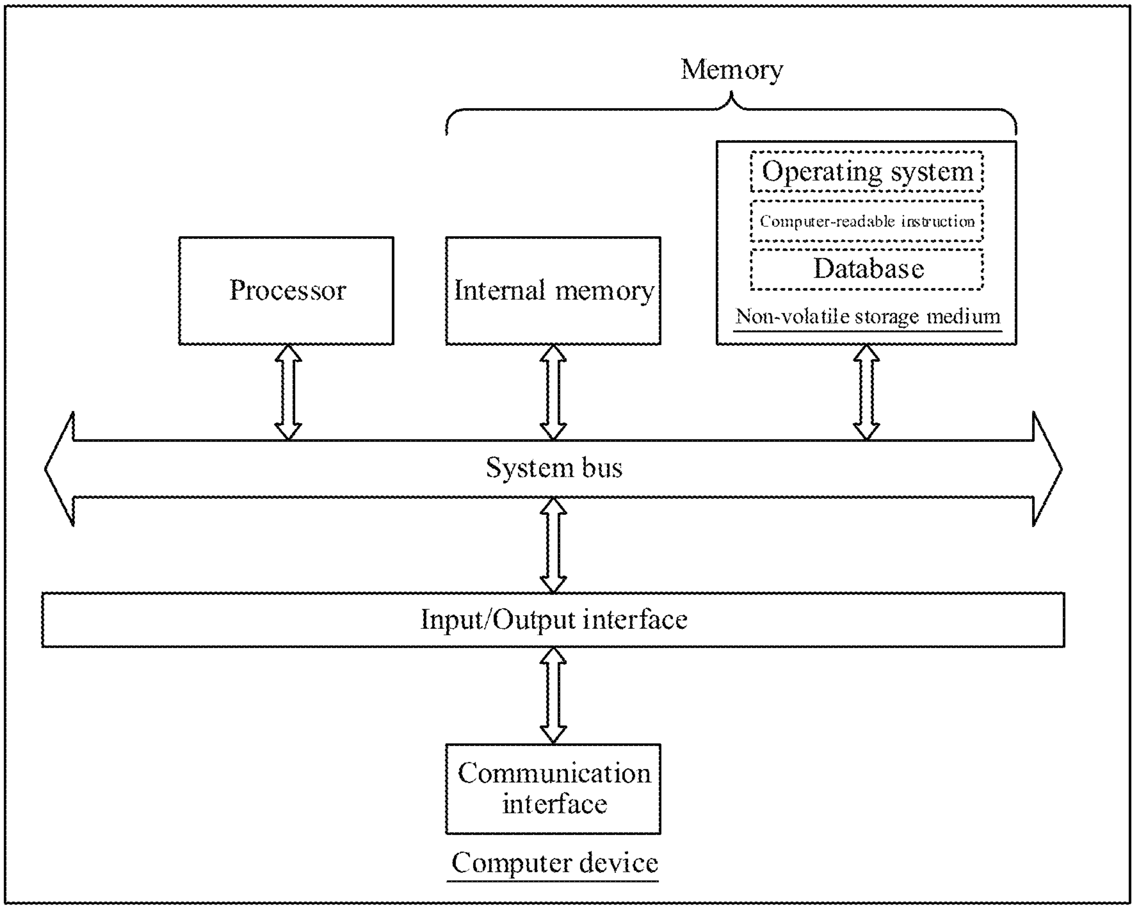
FIG. 13 is a diagram of an internal structure of a computer device according to some embodiments.

A person skilled in the art may understand that, the structure shown in FIG. 13 is only a block diagram of a part of a structure related to some embodiments and does not limit the computer device. The computer device may include more or fewer components than those in the drawings, or some components are combined, or a different component deployment is used.

In some embodiments, a computer device is further provided, including a memory and one or more processors. The memory has computer-readable instructions stored therein, the computer-readable instructions, when executed by the processors, causing the one or more processors to perform operations of the various method embodiments described above.

In some embodiments, one or more computer-readable storage media are provided, having computer-readable instructions stored therein, the computer-readable instructions, when executed by one or more processors, causing the one or more processors to perform operations of the method according to some embodiments.

In some embodiments, a computer-readable instruction product is provided, including computer-readable instructions, the computer-readable instructions, when executed by a processor, performing operations of the method according to some embodiments.

A person of ordinary skill in the art may understand that some embodiments may be implemented by computer-readable instructions instructing relevant hardware. The computer-readable instructions may be stored in a non-volatile computer-readable storage medium. When the computer-readable instructions are executed, the procedures of the method according to some embodiments may be included. Any reference to a memory, a database, or another medium used may include at least one of a non-volatile memory and a volatile memory. The non-volatile memory may include a read-only memory (ROM), a magnetic tape, a floppy disk, a flash memory, an optical memory, a high-density embedded non-volatile memory, a resistive random access memory (ReRAM), a magnetoresistive random access memory (MRAM), a ferroelectric random access memory (FRAM), a phase change memory (PCM), a graphene memory, and the like. The volatile memory may include a random access memory (RAM) or an external cache. For the purpose of description instead of limitation, the RAM is available in a plurality of forms, such as a static random access memory (SRAM) or a dynamic random access memory (DRAM). The database may include at least one of a relational database and a non-relational database. The non-relational database may include a blockchain-based distributed database, but is not limited thereto. The processor may be a central processing unit, a graphics processing unit, a digital signal processor, a programmable logic device, or a quantum computing-based data processing logic device, for example, but the disclosure is not limited thereto.

Some embodiments are used for describing, instead of limiting the technical solutions of the disclosure. A person of ordinary skill in the art shall understand that although the disclosure has been described in detail with reference to some embodiments, modifications can be made to the technical solutions described in some embodiments, or equivalent replacements can be made to some technical features in the technical solutions, provided that such modifications or replacements do not cause the essence of corresponding technical solutions to depart from the spirit and scope of the technical solutions of the embodiments of the disclosure and the appended claims.

What is claimed is:

1. An audio watermark processing method, performed by a computer device, comprising:
   - obtaining input audio from an input audio signal, an input audio transmission, an input audio stream, or an input audio file;
   - segmenting the input audio, to obtain a plurality of audio segments;
   - determining a plurality of original frequency domain coefficients for the plurality of audio segments;
   - obtaining embedding information comprising watermark information and mark information for positioning the watermark information;
   - determining, based on the embedding information, adjustment information corresponding to a first original frequency domain coefficient of a first audio segment of the plurality of audio segments;
   - performing an inverse frequency domain transformation on the adjustment information, to obtain a first superimposing segment corresponding to the first audio segment;
   - superimposing the first audio segment and the first superimposing segment, to obtain a target audio segment;
   - obtaining a plurality of target audio segments, embedded with the watermark information; and
   - outputting, as at least one of a target audio signal, a target audio transmission, a target audio stream, or a target audio file, target audio comprising the plurality of target audio segments,
   - wherein the mark information comprises first mark information and second mark information, and the first mark information and the second mark information satisfy a preset similarity condition.

2. The audio watermark processing method according to claim 1, wherein the first original frequency domain coefficient comprises one or more bits of frequency domain coefficients, and the embedding information comprises a plurality of pieces of unit embedding information, and
   - wherein the determining the adjustment information comprises:
     - allocating a piece of unit embedding information to the first audio segment;
     - determining, for the first audio segment, an adjustment mark matching the one or more bits of frequency domain coefficients;
   - determining, based on the piece of unit embedding information, one or more target adjustment modes corresponding to one or more adjustment marks; and
     - determining, according to the one or more target adjustment modes, the adjustment information.

3. The audio watermark processing method according to claim 2, wherein the allocating the piece of unit embedding information comprises:
   - determining, according to a sequence of the plurality of pieces of unit embedding information, current unit embedding information from the embedding information;
   - determining, according to a first time sequence of the first audio segment, a current audio segment from the plurality of audio segments;
   - allocating the current unit embedding information to the current audio segment;
   - using a next piece of unit embedding information as next current unit embedding information of a next allocation, and using a next audio segment of the current audio segment as a next current audio segment of the next allocation;
   - repeating the allocating the next current unit embedding information until last-bit unit embedding information in the embedding information is allocated;
   - using first-bit unit embedding information in the embedding information as next cycle current unit embedding information of a next cycle; and
   - performing a plurality of cycle allocations until the plurality of audio segments are allocated with the plurality of pieces of unit embedding information.

4. The audio watermark processing method according to claim 2, wherein the determining the adjustment mark comprises:
   - obtaining, for the first audio segment, an adjustment mask corresponding to the first audio segment, wherein the adjustment mask comprises the one or more adjustment marks; and
   - using an $l^{th}$ adjustment mark in the adjustment mask of an $l^{th}$ bit of frequency domain coefficient in the one or more bits of frequency domain coefficients of the first audio segment, wherein l is a positive integer greater than 1 and less than or equal to a number of the one or more bits of frequency domain coefficients.

5. The audio watermark processing method according to claim 2, wherein a plurality of value types of the plurality of pieces of unit embedding information comprise a first type and a second type, and
   - wherein, for a first adjustment mark, a first adjustment direction of a first target adjustment mode determined based on one or more first pieces of unit embedding information of the first type is opposite to a second adjustment direction of a second target adjustment mode determined based on one or more second pieces of unit embedding information of the second type.

6. The audio watermark processing method according to claim 5, wherein the determining the one or more target adjustment modes comprises:
   - determining a value type of the piece of unit embedding information;
   - based on the value type being the first type, using one or more initial adjustment modes corresponding to the one or more adjustment marks as the one or more target adjustment modes; and
   - based on the value type being the second type, performing reverse processing on the one or more initial adjustment modes to obtain the one or more target adjustment modes.

7. The audio watermark processing method according to claim 1, wherein the obtaining the plurality of target audio segments comprises:
   - determining a plurality of time sequences corresponding to the plurality of target audio segments; and
   - splicing the plurality of target audio segments according to the plurality of time sequences to obtain the target audio, wherein the target audio is embedded with the watermark information.

8. An audio watermark processing apparatus, comprising:

at least one memory configured to store computer program code; and at least one processor configured to read the program code and operate as instructed by the program code, the program code comprising:

first obtaining code configured to cause at least one of the at least one processor to obtain input audio from an input audio signal, an input audio transmission, an input audio stream, or an input audio file;

segmentation code configured to cause at least one of the at least one processor to segment the input audio to obtain a plurality of audio segments;

first determining code configured to cause at least one of the at least one processor to determine a plurality of original frequency domain coefficients corresponding to the plurality of audio segments;

watermark code configured to cause at least one of the at least one processor to obtain embedding information comprising watermark information and mark information for positioning the watermark information;

first adjustment code configured to cause at least one of the at least one processor to determine based on the embedding information, adjustment information corresponding to a first original frequency domain coefficient of a first audio segment of the plurality of audio segments;

second adjustment code configured to cause at least one of the at least one processor to perform an inverse frequency domain transformation on the adjustment information, to obtain a first superimposing segment corresponding to the first audio segment;

superimposition code configured to cause at least one of the at least one processor to superimpose the first audio segment and the first superimposing segment, to obtain a target audio segment;

second obtaining code configured to cause at least one of the at least one processor to obtain a plurality of target audio segments embedded with the watermark information; and outputting code configured to cause at least one of the at least one processor to output, as at least one of a target audio signal, a target audio transmission, a target audio stream, or a target audio file, target audio comprising the plurality of target audio segments, wherein the mark information comprises first mark information and second mark information, and the first mark information and the second mark information satisfy a preset similarity condition.

9. The audio watermark processing apparatus according to claim 8, wherein the first original frequency domain coefficient comprises one or more bits of frequency domain coefficients, and the embedding information comprises a plurality of pieces of unit embedding information, and wherein the first adjustment code comprises:

allocation code configured to cause at least one of the at least one processor to allocate a piece of unit embedding information to the first audio segment;

second determining code configured to cause at least one of the at least one processor to determine, for the first audio segment, an adjustment mark matching the one or more bits of frequency domain coefficients;

third determining code configured to cause at least one of the at least one processor to determine, based on the piece of unit embedding information, one or more target adjustment modes corresponding to one or more adjustment marks; and fourth determining code configured to cause at least one of the at least one processor to determine, according to the one or more target adjustment modes, the adjustment information.

10. The audio watermark processing apparatus according to claim 9, wherein the allocation code is configured to cause at least one of the at least one processor to:

determine, according to a sequence of the plurality of pieces of unit embedding information, current unit embedding information from the embedding information;

determine, according to a first time sequence of the first audio segment, a current audio segment from the plurality of audio segments;

allocate the current unit embedding information to the current audio segment;

use a next piece of unit embedding information as next current unit embedding information of a next allocation, and using a next audio segment of the current audio segment as a next current audio segment of the next allocation;

repeat the allocate the next current unit embedding information until last-bit unit embedding information in the embedding information is allocated;

use first-bit unit embedding information in the embedding information as next cycle current unit embedding information of a next cycle; and perform a plurality of cycle allocations until the plurality of audio segments are allocated with the plurality of pieces of unit embedding information.

11. The audio watermark processing apparatus according to claim 9, wherein the second determining code is configured to cause at least one of the at least one processor to:

obtain, for the first audio segment, an adjustment mask corresponding to the first audio segment, wherein the adjustment mask comprises the one or more adjustment marks; and use an $l^{th}$ adjustment mark in the adjustment mask of an $l^{th}$ bit of frequency domain coefficient in the one or more bits of frequency domain coefficients of the first audio segment, wherein l is a positive integer greater than 1 and less than or equal to a number of the one or more bits of frequency domain coefficients.

12. The audio watermark processing apparatus according to claim 9, wherein a plurality of value types of the plurality of pieces of unit embedding information comprise a first type and a second type, and wherein, for a first adjustment mark, a first adjustment direction of a first target adjustment mode determined based on one or more first pieces of unit embedding information of the first type is opposite to a second adjustment direction of a second target adjustment mode determined based on one or more second pieces of unit embedding information of the second type.

13. The audio watermark processing apparatus according to claim 12, wherein the third determining code is configured to cause at least one of the at least one processor to:

determine a value type of the piece of unit embedding information;

based on the value type being the first type, use one or more initial adjustment modes corresponding to the one or more adjustment marks as the one or more target adjustment modes; and based on the value type being the second type, perform reverse processing on the one or more initial adjustment modes to obtain the one or more target adjustment modes.

14. The audio watermark processing apparatus according to claim 8, wherein the second obtaining code is configured to cause at least one of the at least one processor to:

determine a plurality of time sequences corresponding to the plurality of target audio segments; and splice the plurality of target audio segments according to the plurality of time sequences to obtain the target audio, wherein the target audio is embedded with the watermark information.

15. A non-transitory computer-readable storage medium, storing computer code which, when executed by at least one processor, causes the at least one processor to at least:

obtain input audio from an input audio signal, an input audio transmission, an input audio stream, or an input audio file;

segment the input audio to obtain a plurality of audio segments;

determine a plurality of original frequency domain coefficients corresponding to the plurality of audio segments;

obtain embedding information comprising watermark information and mark information for positioning the watermark information;

determine based on the embedding information, adjustment information corresponding to a first original frequency domain coefficient of a first audio segment of the plurality of audio segments;

perform an inverse frequency domain transformation on the adjustment information, to obtain a first superimposing segment corresponding to the first audio segment;

superimpose the first audio segment and the first superimposing segment, to obtain a target audio segment;

obtain a plurality of target audio segments embedded with the watermark information; and output, as at least one of a target audio signal, a target audio transmission, a target audio stream, or a target audio file, target audio comprising the plurality of target audio segments, wherein the mark information comprises first mark information and second mark information, and the first mark information and the second mark information satisfy a preset similarity condition.

16. The non-transitory computer-readable storage medium according to claim 15, wherein the first original frequency domain coefficient comprises one or more bits of frequency domain coefficients, and the embedding information comprises a plurality of pieces of unit embedding information, and wherein the determining the adjustment information comprises:

allocating a piece of unit embedding information to the first audio segment;

determining, for the first audio segment, an adjustment mark matching the one or more bits of frequency domain coefficients;

determining, based on the piece of unit embedding information, one or more target adjustment modes corresponding to one or more adjustment marks; and determining, according to the one or more target adjustment modes, the adjustment information.

17. The non-transitory computer-readable storage medium according to claim 16, wherein the allocating the piece of unit embedding information comprises:

determining, according to a sequence of the plurality of pieces of unit embedding information, current unit embedding information from the embedding information;

determining, according to a first time sequence of the first audio segment, a current audio segment from the plurality of audio segments;

allocating the current unit embedding information to the current audio segment;

using a next piece of unit embedding information as next current unit embedding information of a next allocation, and using a next audio segment of the current audio segment as a next current audio segment of the next allocation;

repeating the allocating the next current unit embedding information until last-bit unit embedding information in the embedding information is allocated;

using first-bit unit embedding information in the embedding information as next cycle current unit embedding information of a next cycle; and performing a plurality of cycle allocations until the plurality of audio segments are allocated with the plurality of pieces of unit embedding information.

* * * * *